(12) United States Patent
Kamanuma et al.

(10) Patent No.: US 6,256,473 B1
(45) Date of Patent: Jul. 3, 2001

(54) IMAGE FORMING APPARATUS CAPABLE OF COPYING ORIGINAL SHEETS HAVING DIFFERENT SIZES INTO SHEETS HAVING DIFFERENT SIZES

(75) Inventors: Satoshi Kamanuma; Akiyoshi Johdai, both of Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/258,070

(22) Filed: Feb. 26, 1999

(30) Foreign Application Priority Data

Feb. 27, 1998 (JP) .................................................. 10-047779

(51) Int. Cl.[7] .................................................. G03G 15/00
(52) U.S. Cl. ............................ 399/367; 399/368; 399/370
(58) Field of Search .................................... 271/3.01, 123, 271/287, 290; 399/364, 367, 370, 403, 410

(56) References Cited

U.S. PATENT DOCUMENTS

| | | | |
|---|---|---|---|
| 4,980,721 | * | 12/1990 | Ishikawa et al. ..................... 399/367 |
| 5,081,489 | * | 1/1992 | Ishikawa et al. ..................... 399/367 |

FOREIGN PATENT DOCUMENTS 05292268    5/1993   (JP) .

* cited by examiner

*Primary Examiner*—Sophia S. Chen
*Assistant Examiner*—Hoang Ngo
(74) *Attorney, Agent, or Firm*—McDermott, Will & Emery

(57) ABSTRACT

An image forming apparatus is provided with an automatic document feeder 20 having an original tray 2101, image reading sections 11 and 12 and a printer section P. The apparatus is provided with an insertion sheet detector for discriminating, when a composite original sheet group obtained by inserting between arbitrary pages of a first original sheet group comprised of original sheets of an identical size an insertion sheet of a size identical to that of the original sheets is set on the original tray 2101, whether the sheet fed to the image reading position is the original sheet of the first original sheet group or the insertion sheet. Through the process of forming the print group corresponding to the above composite original sheet group, the image of a second original prepared separately from the composite original sheet group is formed instead of the image of the insertion sheet. This image forming apparatus can automatically reliably form in a short time a print group corresponding to a state in which a certain original sheet group receives another original sheet to be inserted between arbitrary pages of the original sheet group.

13 Claims, 15 Drawing Sheets

IMAGE FORMING APPARATUS CAPABLE OF COPYING ORIGINAL SHEETS HAVING DIFFERENT SIZES INTO SHEETS HAVING DIFFERENT SIZES

This application is based on application No. 10-47779 filed in Japan, the contents of which are hereby incorporated by reference.

BACKGROUND OF THE INVENTION

The present invention relates to an image forming apparatus provided with an automatic document feeder, and in particular, to an image forming apparatus capable of obtaining a print (copy) sheet group corresponding to a state in which a certain original sheet group receives another original sheet to be inserted between arbitrary pages of the original sheet group.

In order to obtain a print sheet group corresponding to a state in which a certain original sheet group receives another original sheet to be inserted between arbitrary pages of the original sheet group by means of an image forming apparatus provided with an automatic document feeder, there is often adopted the method of preparatorily inserting another original sheet into the original sheet group, setting the resulting sheet group on the automatic document feeder and executing copying. This method has no problem when the original sheet group and the inserted original sheet have the same size. However, when they have different sizes, the original sheets cannot be conveyed depending on the type of the automatic document feeder, or productivity in print formation might sometimes be extremely reduced. For example, if it is tried to successively feed original sheets of different widths by means of an automatic document feeder based on the center-sheet-feed standard, then the original sheet having the narrower width cannot be regulated in the widthwise direction, and this causes original sheet jam (paper jam). If original sheets of different sizes are concurrently stacked on a sheet feed tray, then the original sizes cannot be discriminated by a sensor on the sheet feed tray. Therefore, the image forming apparatus of the type which takes the original image while moving the original has the practice of once feeding (merely conveying) the original sheet so as to detect the original size by means of a sensor on the conveyance path and thereafter feeding the sheet again for the reading of the original image. For the above reasons, a processing time for reading the original is prolonged, causing a reduction in productivity.

In order to provide a method for resolving these problems, there has been a proposed digital copying machine that once stores image information of original sheets into a memory in units of pages and designates an arbitrary position of the stored image information by an insertion position designating button on an operation panel, thereby allowing other image information to be inserted in the position (the prior art reference of Japanese Patent Laid-Open Publication No. HEI 5-292268).

However, according to the above-mentioned digital copying machine, an operator is required to input the original insertion positions one by one via the operation panel or the like, and this has the problem that a long time is required for the input work. Furthermore, the problem that the original sheet has not been inserted in the desired position or a similar problem tends to occur due to an erroneous input.

SUMMARY OF THE INVENTION

Accordingly, the object of the present invention is to provide an image forming apparatus capable of automatically reliably forming in a short time a print sheet group corresponding to a state in which a certain original sheet group receives another original sheet to be inserted between arbitrary pages of the original sheet group.

In order to achieve the above object, there is provided an image forming apparatus comprising:
an original conveyer which successively supplies original sheets of an original sheet group placed in a specified position to an image reading position;
an image reader which reads an image of the original fed to the image reading position;
a discriminating section which, when a composite original sheet group obtained by making a first original sheet group comprised of original sheets of an identical size receive an insertion sheet that has the identical size and is to be inserted between arbitrary pages of the original sheet group is set in the specified position, discriminates whether the sheet fed to the image reading position by the original conveyer is the original sheet of the first original sheet group or the insertion sheet; and
a controller which forms an image different from the image of the first original sheet group instead of the image of the insertion sheet in an image forming process of the composite original sheet group.

It is to be noted that the expression of "original sheet group" includes not only a group of a plurality of original sheets but also a group of a single original.

It is to be noted that the expression of "between pages" also includes the positions corresponding to the first page and the last page of the original sheet group.

According to the image forming apparatus having the above construction, a composite original sheet group obtained by inserting between arbitrary pages of a first original sheet group comprised of original sheets of an identical size an insertion sheet of a size identical to that of the original sheets is set in a specified position of a document feeder by an operator. The document feeder supplies the original sheets from the set composite original sheet group successively to an image reading position A. In this stage, it is discriminated whether the sheet fed to the image reading position A by discriminating sections is the original sheet of the first original sheet group or the insertion sheet. Image reading sections successively read the image data of the original fed to the image reading position A. A controller forms an image of a second original sheet prepared separately from the composite original sheet group instead of the image of the insertion sheet through the image forming process of the composite original sheet group. Consequently, a print group corresponding to a state in which second original sheets are inserted between the arbitrary pages of the first original sheet group is automatically obtained. This image forming apparatus has a mode in which the operator designates the insertion position of the second original sheets utilizing the insertion sheet. With this arrangement, the operator is not required to input the original sheet insertion positions one by one via the operation panel or the like, and therefore, the input work can be executed in a short time. Furthermore, no erroneous input occurs, so that the desired print group can be reliably obtained.

Since the first original sheet group and the insertion sheet included in the composite original sheet group have an identical size, there occurs neither the problem of the regulation in the widthwise direction nor the problem of the reduction in productivity due to the mere conveyance for the detection of the original sheet size.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the image forming apparatus of the present invention will be described in detail below.

Figure 16:
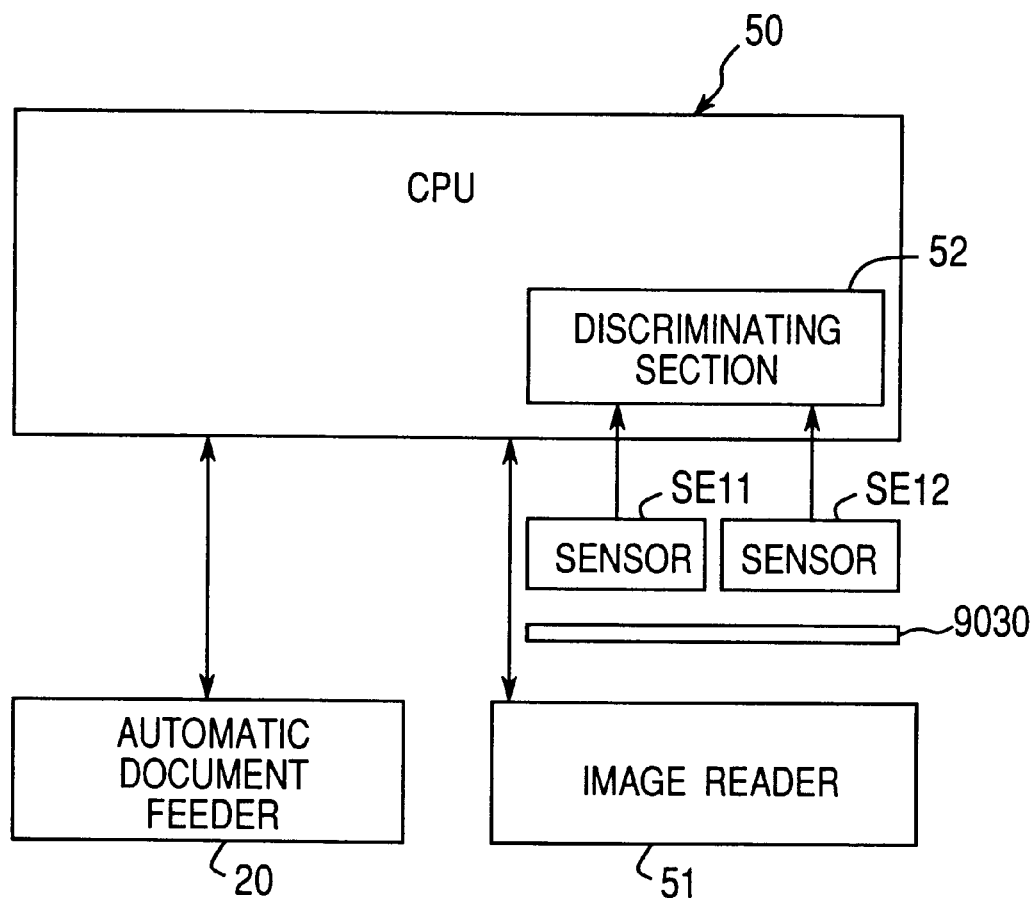
FIG. 16 is a general block diagram of the main portion of a digital copying machine.

FIG. 16 is a general block diagram of the main portion of a digital copying machine according to one embodiment of the present invention. This digital copying machine is comprised of a CPU 50 as a controller for controlling image forming processes described later; an automatic document feeder 20 for successively supplying original sheets of an original sheet group placed in a specified position to an image reading position; an image reader 51 for reading an image of the original fed to the image reading position, and being comprised of an optical system 11 and an image processing section 12 described later; a discriminating section for discriminating whether the sheet fed to the image reading position by the automatic document feeder 20 is the original sheet of the first original sheet group or an insertion sheet 9030, receiving signals from original loading sensors SE1 and SE2, when a composite original sheet group obtained by making a first original sheet group comprised of original sheets of an identical size receiving an insertion sheet 9030 that has the identical size and is inserted between arbitrary pages of the original sheet group is set in the specified position.

Figure 1:
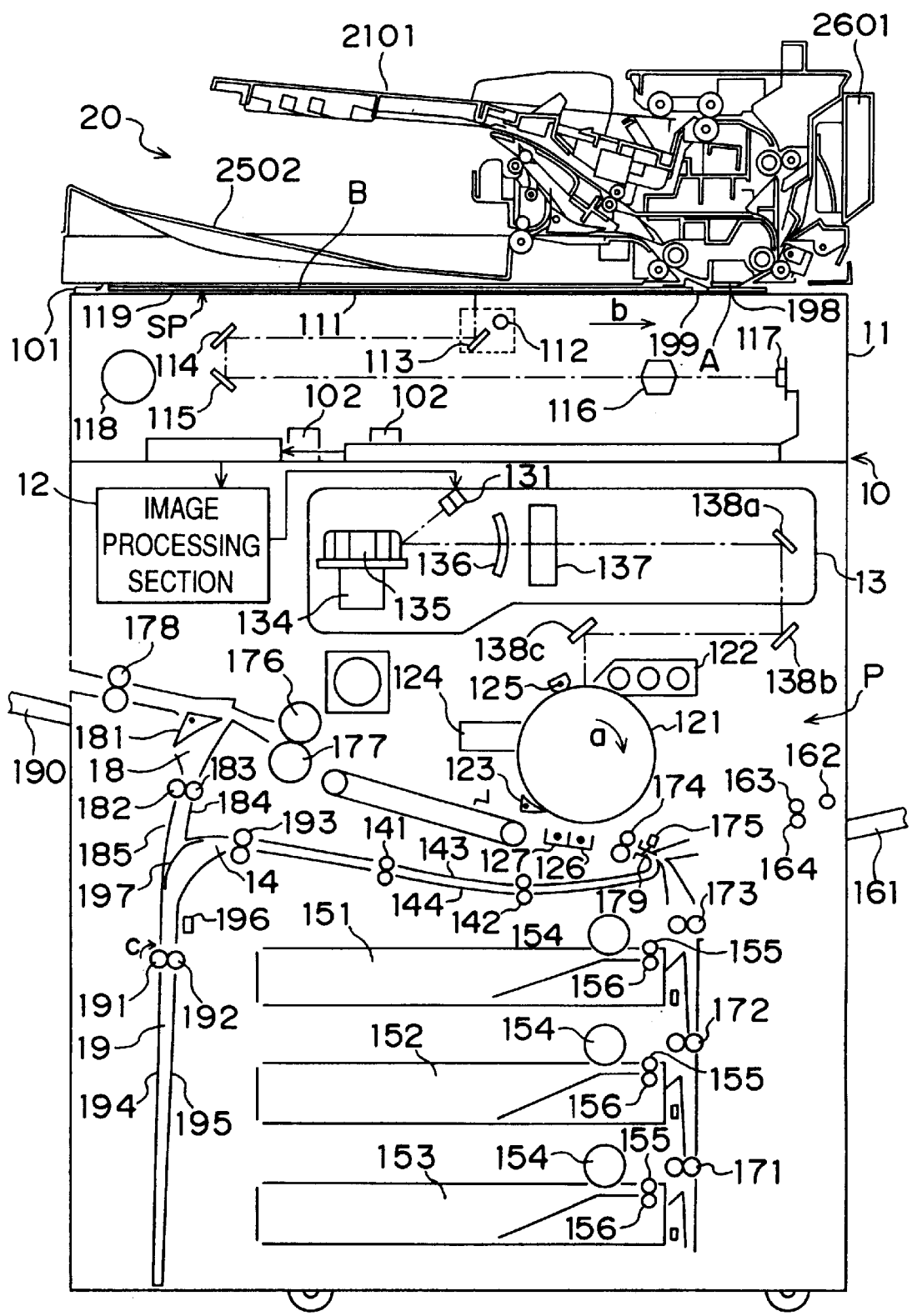
FIG. 1 is a schematic sectional view of a copying machine according to one embodiment of the image forming apparatus of the present invention.

FIG. 1 schematically shows the construction of a digital copying machine according to one embodiment having a main body 10 and an automatic document feeder 20 provided on the main body.

(1) The main body 10 will be described first.

In the main body 10, an optical system 11 is arranged just below a glass 111 (referred to as a "platen glass" hereinafter) on which an original sheet is to be placed, and a printer section P is further arranged below the optical system.

i) The optical system 11 is constructed of an exposure lamp 112 for illuminating an original sheet placed on the platen glass 111, reflecting mirrors 113, 114 and 115 for deflecting the optical path of light reflected on the original sheet, a lens 116 having focus distributing and magnification changing functions, a CCD sensor 117, an optical system motor 118 for driving the optical system and a shading correction plate 119 arranged on the platen glass 111 in order to correct a variation in sensitivity of the CCD sensor 117.

At the left-hand end portion of the platen glass 111 is arranged an original reference plate (original scale) 101 for executing the positioning of an original sheet in the depth-wise direction. An operator sets an original sheet on the platen glass 111 with the image-carrying surface of the original sheet facing down and with one end of the original sheet aligned with the original scale 101. The optical system 11 illuminates the image of the set original sheet while scanning the same and makes its reflection light incident on the CCD sensor 117 via the lens 116. The CCD sensor 117 first reads the shading correction plate 119 and then corrects variations in sensitivity between the pixels of the CCD sensor 117. Subsequently, the optical system motor 118 is driven to slide the exposure lamp 112 and the reflecting mirrors 113, 114 and 115 and set the same in an original reference position SP. Then, the exposure lamp 112 and the reflection mirror 113 move in the direction of arrow "b" at a rate of V/M (M: copying magnification ratio) relative to a peripheral velocity V (constant regardless of the copying magnification ratio) of a photoreceptor drum 121. At the same time, the reflection mirrors 114 and 115 move in the direction of arrow "b" at a rate of V/2M. By these operations, the image is read with the constant optical path length.

On the right-hand side of the platen glass 111 is arranged a slit glass 198 (see FIG. 2) for reading the image of the original sheet conveyed by the automatic document feeder 20. At the time of the conveyance of the original sheet by the automatic document feeder 20, the exposure lamp 112 and the mirror 113 of the optical system 11 are each fixed in a position facing the slit glass 198 and effects illumination and reflection when the original sheet passes over the slit glass 198. The reflection light is read by the CCD sensor 117 via the lens 116.

At the left-hand end of the slit glass 198 is arranged a scoop guide 199 for taking the original sheet again into the automatic document feeder 20.

With regard to the normal cut sheet original of the standard size, reading via a reading position A on the slit glass 198 is executed mainly by the automatic document feeder 20. When making a copy of an original of the other sheet type or size inappropriate for use in the automatic document feeder 20, the original sheet is placed in a reading position B on the platen glass 111, and the reading is executed by a scan along the original sheet surface.

An original sheet size detection sensor 102, which is constructed of a plurality of reflection type sensors, detects the size of the original sheet set on the platen glass 111. The arrangement and the original sheet size detection method of this original sheet size detection sensor are known techniques, and therefore, no detailed description is provided herein for them.

ii) The printer section P includes an image processing section 12 that has a storage medium and is able to execute an image reversing process, a laser scan unit 13, a photoreceptor drum 121 and sheet supply cassettes 151, 152 and 153.

The image processing section 12 processes the image data read by the CCD sensor 117 of the optical system 11 and outputs the resulting data to the laser scan unit 13.

A semiconductor laser diode (LD) 131 of the laser scan unit 13 emits a laser light converted from the image data processed by the image processing section 12. The laser light emitted from the LD 131 is reflected on a polygon mirror 135 of a polygon scanner 134 that is rotating at high speed, deflected by a toroidal lens 136 and an fθ-lens 137, reflected on return mirrors 138*a*, 138*b* and 138*c* and exposed onto the photoreceptor drum 121.

Along the peripheral surface of the photoreceptor drum 121 are arranged an electrostatic charger 125, a developer 122, a transfer charger 126, a separation charger 127, a separation pawl 123 and a cleaning unit 124 in this order. There are provided upper and lower fixing rollers 176 and 177, a discharge roller pair 178 and a copy tray 190 that protrudes leftward from the main body 10.

An upper-tier cassette 151, a middle-tier cassette 152 and a lower-tier cassette 153 are each provided with a pickup roller 154, a sheet feed roller 155 and a separation roller 156. Sheets (regular paper) for copying use are set in the cassettes 151, 152 and 153.

There is a manual feed tray 161 that protrudes rightward from the main body 10. Near the manual feed tray 161 are arranged a pickup roller 162, a sheet feed roller 163 and a separation roller 164.

There are provided conveyance roller pairs 171, 172 and 173 and a timing roller pair 174.

iii) If a copy start key 301 on the operation panel (see FIG. 3) 30 provided on the main body 10 is depressed by the operator, then this copying machine selects the cassette in which the sheets of the desired size are set among the upper-tier/middle-tier/lower-tier cassettes 151, 152 and 153 on the basis of the size of the original sheet read by the original sheet size detection sensor 102 or an original sheet size detector described later. Subsequently, the pickup roller 154, the sheet feed roller 155 and the separation roller 156 of the cassette selected by a sheet feed motor (not shown) are driven to rotate, thereby conveying the uppermost sheet of the sheet group set in the cassette toward the downstream side. In this stage, a plurality of sheets are separated into individual sheets by the pickup roller 154 and the separation roller 156. This separation mechanism is also a known technique, and therefore, no detailed description is provided herein for them.

Each individual sheet separated by the separation mechanism is conveyed by the conveyance roller pairs 171, 172 and 173 and brought into the nip of the timing roller pair 174 whose rotation is stopped. In this stage, the conveyance roller pairs 171, 172 and 173 and the timing roller pair 174 are receiving a driving power from a sheet feed motor (not shown) that rotatively drives the separation mechanism. The timing roller pair 174 has a clutch (not shown) for rotating and stopping on the driving power transmitting path in order to correct the skewing of the leading end of the sheet and adjust the timing at which the sheet is fed into the image transfer section.

Each of the conveyance roller pairs 171, 172 and 173 has a clutch (not shown) on their roller shafts. These conveyance roller pairs 171, 172 and 173 are independent to each other and able to be rotated or stopped regardless of the driving of the sheet feed motor (not shown).

A sensor 175 arranged in a conveyance path 179 on the upstream side of the timing roller pair 174 detects the leading end of the sheet conveyed from the conveyance roller pair 173. After a lapse of a specified time from the detection of the leading end of the sheet by the sensor 175, the rotation of only the roller that is pressurizing the sheet among the conveyance roller pairs 171, 172 and 173 is stopped by turning off the clutch (not shown). In this stage, the timing roller pair 174 is stopped by the effect of the clutch (not shown), and the sheet forms a loop by being fed by a distance slightly longer than the distance between the sensor 175 and the nip of the timing roller pair 174. By this operation, the skewing relative to the timing roller pair 174 can be corrected. It is to be noted that the conveyance path 179 on the upstream side of the timing roller pair 174 is forming a partially widened sheet path so as to allow the sheet to be put into the loop shape.

On the other hand, the image data of the original sheet is read by the optical system 11, transmitted via the image processing section 12 to the laser scan unit 13 and exposed onto the photoreceptor drum 121 that is rotating in the direction of arrow "a" by the laser scan unit 13. The photoreceptor drum 121 has a characteristic such that it is charged by the electrostatic charger 125 and the electric charges in its portion to which the laser light is applied are removed, and the portion from which the electric charges are removed can attract toner of the same polarity as that of an electrostatic latent image.

In accordance with the timing at which the leading end of the sheet reaches the photoreceptor drum 121, the laser scan unit 13 applies a laser light corresponding to the image data onto the photoreceptor drum 121 pre-charged by the electrostatic charger 125. The developer 122 makes toner adhere to the portion to which the laser light is applied on the photoreceptor drum 121. The toner adhering to the surface of the photoreceptor drum 121 is transferred onto the surface of the sheet by the transfer charger 126.

The sheet that has undergone the desired transfer process has its leading end separated from the surface of the photoreceptor drum 121 by the separation pawl 123. In this stage, by simultaneously performing AC discharging by the separation charger 127, the sheet is successfully separated without being wound around the photoreceptor drum 121.

The sheet onto which the toner has been transferred is heated and pressurized by the upper and lower fixing rollers 176 and 177 and discharged onto the copy tray 190 by the discharge roller pair 178.

iv) On the upstream side of the discharge roller pair 178 is provided a conveying portion 18 for conveying the sheet obtained after the fixation to a switchback portion 19. This conveyance portion 18 is constructed of a diverter pawl 181 driven by a solenoid (not shown), conveyance rollers 182 and 183 and conveyance guides 184 and 185.

The switchback portion 19 has a conveyance roller 191 that is constructed so as to be rotatable forwardly or reversely by a drive source (not shown), a follower roller 192 that is arranged opposite to the roller and is not driven, a conveyance roller pair 193 that is constructed so as to be rotatable only in the direction in which the sheet is conveyed to the downstream side, conveyance guides 194 and 195 and a detector 196. A Mylar 197 is arranged at an end portion of the conveyance guide 184. This Mylar 197 prevents the trailing end of the sheet, which is inverted by the switchback portion 19, from reentering the conveyance portion 18 when the sheet is conveyed again to a conveyance portion 14 located on the downstream side.

The conveyance portion 14 is constructed of conveyance roller pairs 141 and 142 and conveyance guides 143 and 144, making the switchback portion 19 communicate with the upstream side of the timing roller pair 174.

Figure 2:
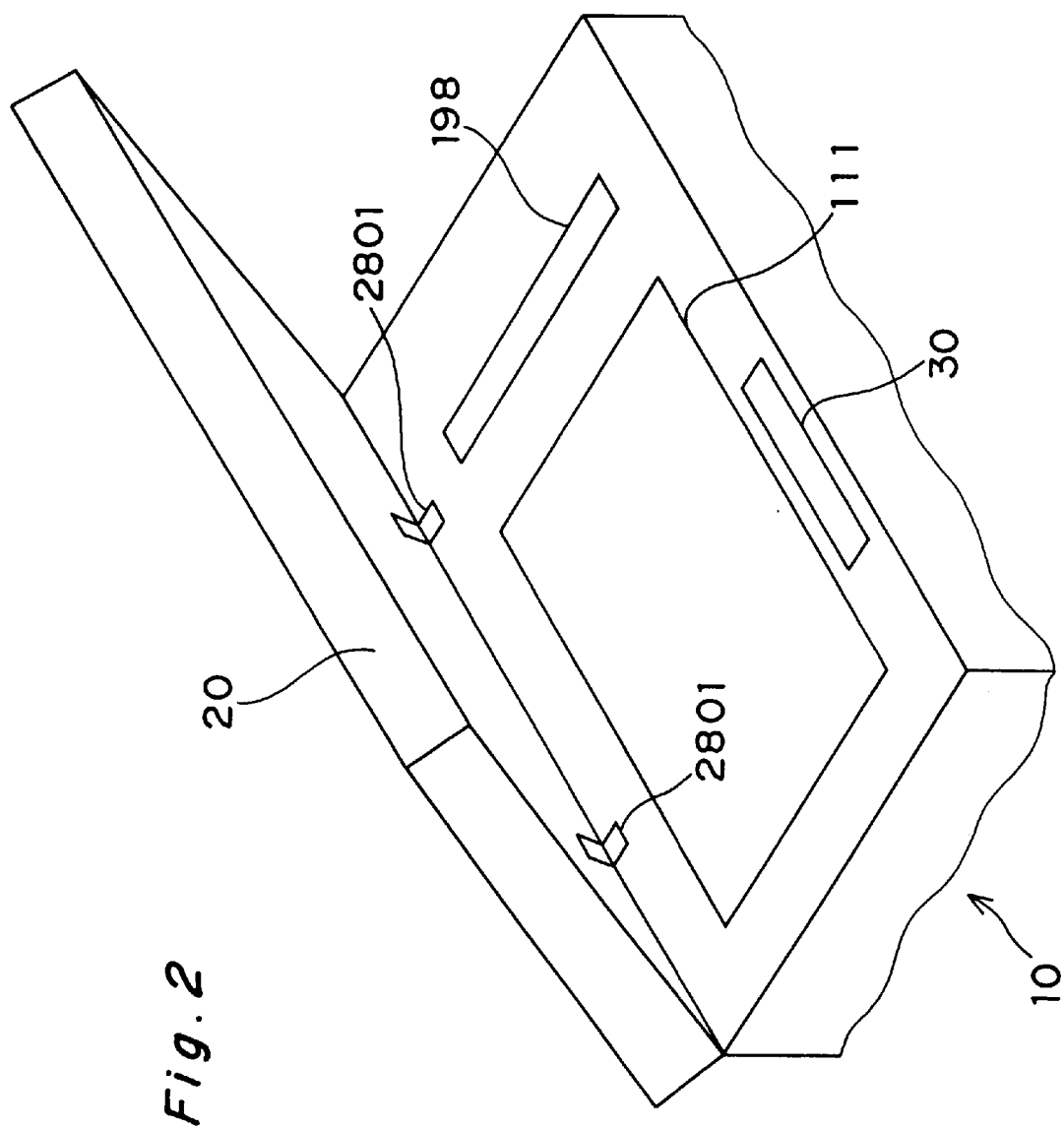
FIG. 2 is a perspective view showing a state in which an automatic document feeder located in the upper portion of the above copying machine is open.
Figure 3:
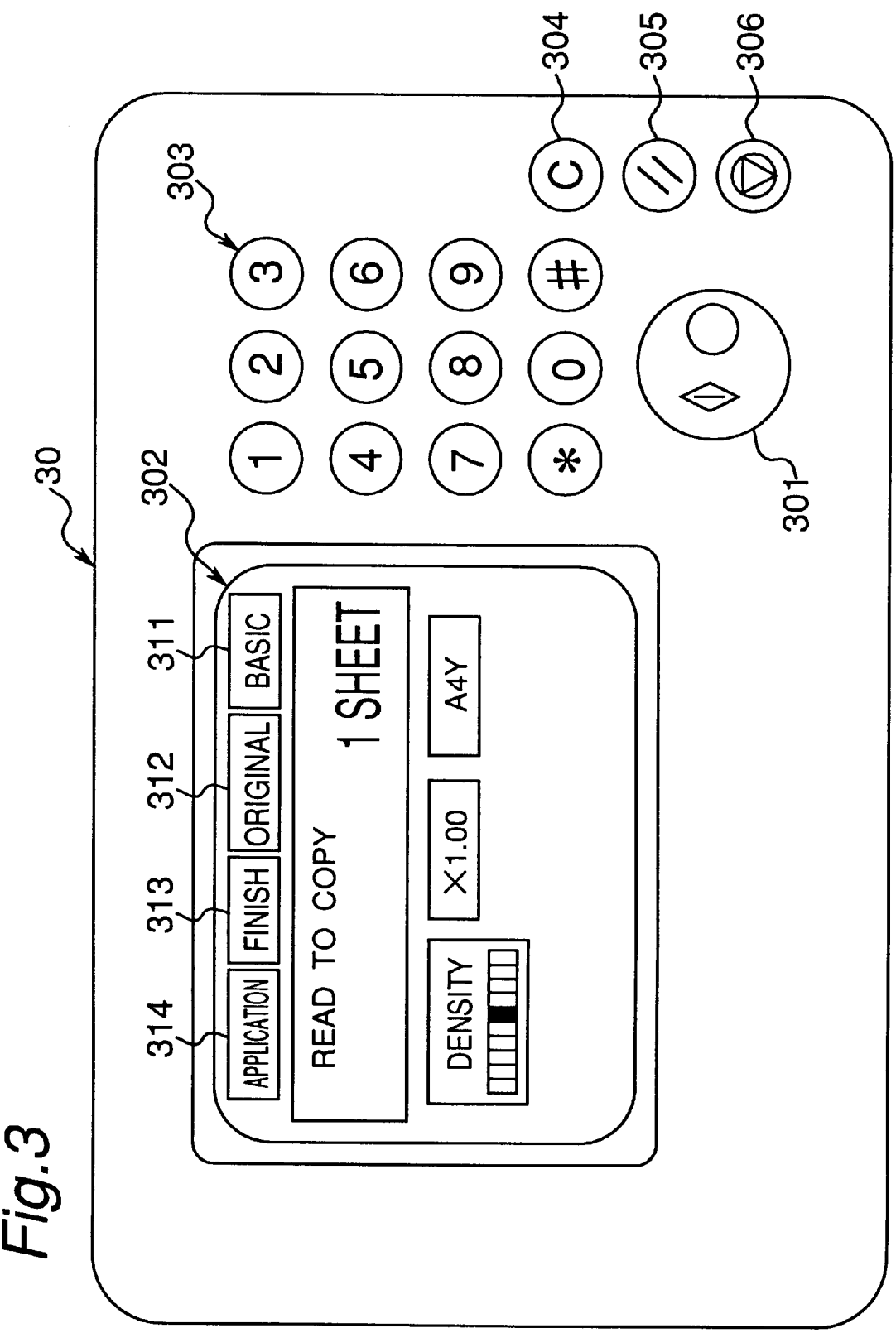
FIG. 3 is a view showing the operation panel of the above copying machine.

If the operator selects a dual-surface copying mode on the operation panel (see FIG. 3) 30 and presses a copy start key 301, then the aforementioned transfer process is executed, and thereafter the sheet is conveyed to the switchback portion 19 through the switching of the conveyance path by the diverter pawl 181. After a lapse of a specified time from the detection of the leading end of the sheet by the detector 196, the conveyance roller 191 is rotated in the direction of arrow "c". Subsequently, after a lapse of a specified time from the detection of the trailing end of the sheet conveyed by the conveyance roller 191 by the detector 196 and after the passing of the sheet trailing end beyond the Mylar 197, the conveyance roller 191 is rotated in the direction opposite to the direction of arrow "c", so that the sheet is conveyed to the conveyance portion 14. The sheet returned by the switchback portion 19 is conveyed in the inverted state toward the upstream side of the timing roller pair 174 by the conveyance roller pair 193 and the conveyance roller pairs 141 and 142 provided in the conveyance portion 14. Then, the transfer process on the opposite surface of the sheet is executed. As described above, the transfer process is executed on both the upper and lower surfaces of the sheet.

v) As shown in FIG. 2, the operation panel 30 is provided on the front side of the upper portion of the main body 10. As shown in FIG. 3, this operation panel 30 is provided with an LCD touch panel 302, a ten-key section 303 for entering a setting number, a clearing key 304 for resetting the setting number to "1", a panel resetting key 305 for resetting the set values in the copying machine to the standard values, a stop key 306 for stopping the copy operation and a start key 301 for starting a copy operation.

The LCD touch panel 302 displays the various states of the occurrence of jam, the occurrence of service personnel call, the occurrence of paper emptiness and so on in the copying machine, the operation modes of the exposure level, magnification ratio, sheet and so on of the copying machine and other various information, and the panel allows the operator to perform inputting for operation mode selection by depressing with his or her finger on the display screen.

On the initial screen (shown in FIG. 3) of the LCD touch panel 302 are shown a basic button 311 for displaying a basic screen, an original button 312 for switching the screen to a sub-menu screen for selecting the original sheet feeding mode (single-sided original, double-sided original or the like), a finish button 313 for switching the screen to a sub-menu screen for selecting the copy finish state (sorting, stapling or the like), an application button 314 for switching the screen to a sub-menu screen for selecting the function of providing the copy with a margin for stapling, the function of inserting an original sheet between pages and so on.

(2) The automatic document feeder 20 will be described next.

As shown in FIG. 2, the automatic document feeder 20 is provided above the platen glass 111 and the slit glass 198 while being supported by a pair of hinges 2801 and 2801 provided on the rear side of the upper portion of the main body 10 so that the feeder can be opened and closed with respect to the main body 10.

Figure 4:
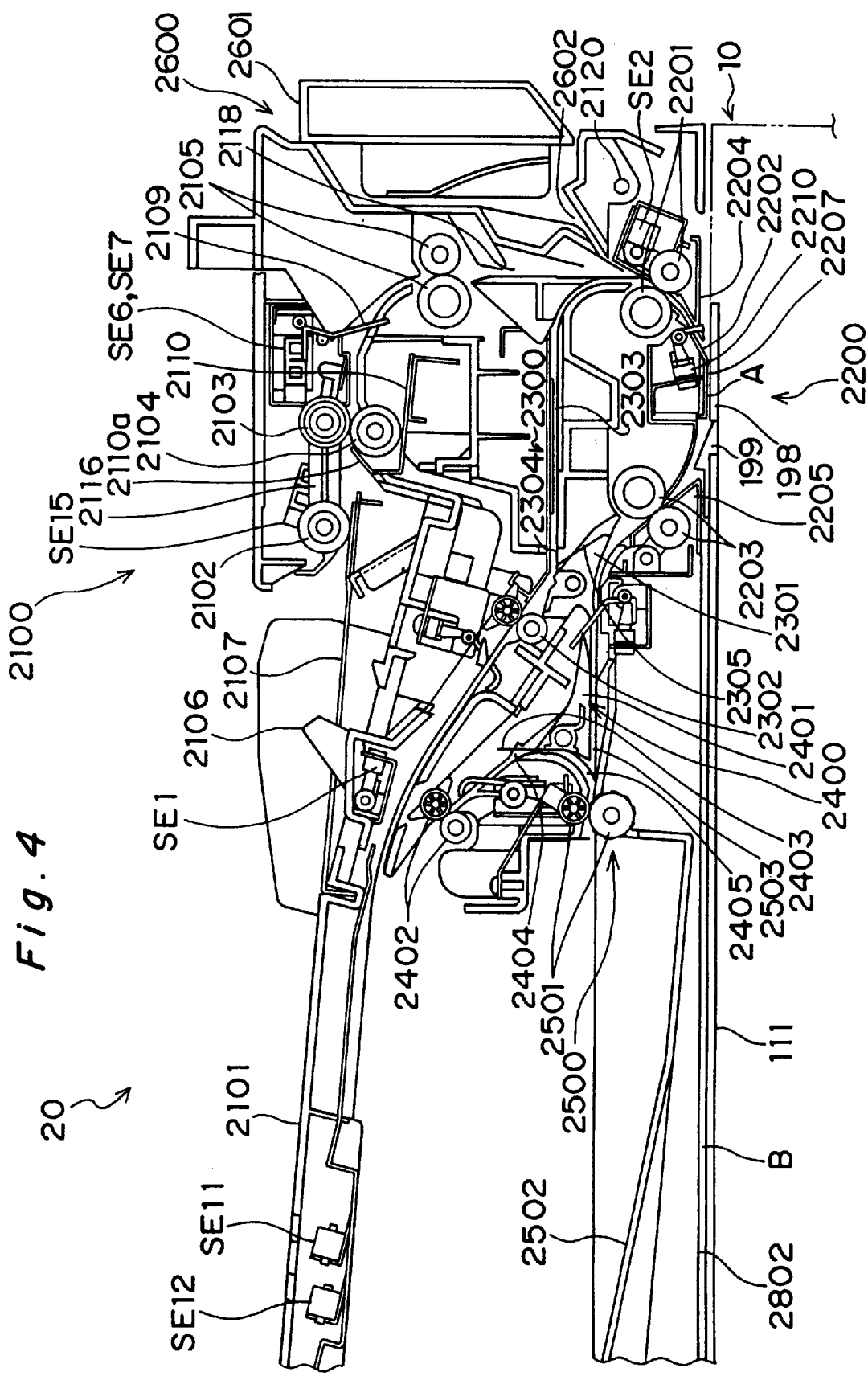
FIG. 4 is a view showing the construction of the above automatic document feeder.

As shown in FIG. 4, this automatic document feeder 20 is constructed roughly of: a sheet feed section 2100 having an original tray 2101, a pickup roller 2102, a sheet feed roller 2103, a separation roller 2104 and an intermediate roller pair 2105; a read section 2200 having a first read roller pair 2201, a reading pressure guide 2202 and a second read roller pair 2203; a first reversing section 2300 having a reversing diverter pawl 2301 and a double-sided sheet inverting roller pair 2302; a second reversing section 2400 having a discharge diverter pawl 2401 and a discharge inverting roller pair 2402; a discharge section 2500 having a discharge roller pair 2501 and a discharge tray 2502; a manual sheet feed section 2600 including a manual sheet feed tray 2601; and an original sheet presser 2802 for holding the original sheet on the platen glass 111.

This automatic document feeder 20 is internally provided with the eight conveyance paths of: a sheet-feeding conveyance path 2118 extending from the sheet feed roller 2103 to the first read roller pair 2201; an reading conveyance path 2207 extending from the first read roller pair 2201 to the second read roller pair 2203; a reversing switchback path 2305 extending from the second read roller pair 2203 to the double-sided sheet inverting roller pair 2302; a reversing path 2303 extending from the double-sided sheet inverting roller pair 2302 to the first read roller pair 2201; a regulation path 2404 extending from the second read roller pair 2203 to the discharge inverting roller pair 2402; a regulation discharge path 2405 extending from the discharge inverting roller pair 2402 to the discharge roller pair 2501; a discharge path 2503 extending from the second read roller pair 2203 to the discharge roller pair 2501; and a manual sheet conveyance path 2602.

This automatic document feeder 20 is provided with a single-sided original mode for reading the image of a single-sided original, a double-sided original mode for reading the image of a double-sided original and a single sheet feeding mode for processing the original of a sheet type inappropriate for the automatic separation sheet feed by means of the sheet feed section 2100.

i) Original sheet conveyance in the single-sided original mode

An original sheet group is set on the original tray 2101 with the first page facing up in the uppermost position. Depending on whether the copy start key 301 on the operation panel 30 is depressed by the operator or an original loading sensor SE1 placed roughly at the center of the original tray 2101 is sensing the loaded original via a paper emptiness sensor lever 2106, a lift-up plate 2107 is moved upward by a drive source (not shown) after a lapse of a specified time, and the pickup roller 2102 comes into pressure contact with the uppermost surface of the original sheet and rotates after a lapse of a specified time to convey the original sheet downstream.

The sheet feed roller 2103 and the separation roller 2104 operate so as to securely separate the original sheets fed by the pickup roller 2102 into individual sheets and convey each sheet. This technique of separation and conveyance is known, and therefore, no detailed description is provided herein therefore.

Next, each sheet, which has been separated and conveyed by the sheet feed roller 2103 and the separation roller 2104 is conveyed through the sheet-feeding conveyance path 2118 by the intermediate roller pair 2105. The leading end of the original sheet is detected by a registration sensor SE2 provided on the upstream side of the first read roller pair 2201, and thereafter, the intermediate roller pair 2105 presses the leading end of the original sheet against the nip portion of the first read roller pair 2201 that is stopping so as to form and keep an appropriate amount of loop of the original sheet. Subsequently, the operation of the intermediate roller pair 2105 stops, thereby allowing the registration of the leading end of the original sheet to be achieved and allowing the skewing of the sheet to be corrected. It is to be noted that the intermediate roller pair 2105 continues to be driven until the trailing end of the original sheet completely passes through the nip portion of the intermediate roller pair 2105.

The original sheet is conveyed by the first read roller pair 2201 and the second read roller pair 2203 through the reading conveyance path 2207 including the image reading position A on the slit glass 198.

The reading pressure guide 2202 is arranged opposite to the slit glass 198 on the main body 10 of the copying machine with a specified interval kept between them. The image of the original sheet that is passing through the image reading position A of the gap between the reading pressure guide 2202 and the slit glass 198 is transmitted through the slit glass 198 so as to be formed on a CCD sensor 117 through the reflecting mirrors 113, 114 and 115 and the lens 116 of the optical system 11 shown in FIG. 1. By this operation, the image of the original is continuously read.

The original document that has undergone the image reading is conveyed through the discharge path 2503 by the discharge roller pair 2501 and then discharged onto the discharge tray 2502 with the first page facing down in the lowermost position.

The subsequent original sheet starts to be fed at the point of time when the trailing end of the document that is currently being read passes through a sheet feed sensor SE6 provided in the conveyance path between the sheet feed and separation rollers 2103 and 2104 and the intermediate roller pair 2105.

The read operation by the optical system 11 starts in accordance with a timing at which the leading end of the original sheet reaches the image reading position A on the slit glass 198 after the leading end of the original sheet has reached an original sensor 2210 provided on the downstream side of the first read roller pair 2201. The read start timing is controlled by the amount of driving of the first and second read roller pairs 2201 and 2203.

On the upstream side of the first read roller pair 2201 is arranged the manual sheet feed tray 2601 that can be pivoted around a hinge 2120. If the operator turns this manual sheet feed tray 2601 clockwise in FIG. 4, then the manual sheet conveyance path 2602 is exposed. If an original sheet is inserted along the manual sheet feed tray 2601 in this state, then the leading end of the original sheet reaches the nip of t he first read roller pair 2201. When the leading end of the original sheet reaches the nip of the first read roller pair 2201, the first read roller pair 2201 starts to be driven after a lapse of a specified time. By this operation, the original sheet is conveyed similar to the aforementioned description.

ii) Original document conveyance in the double-sided original mode

When the double-sided original mode is selected, the reversing diverter pawl 2301 and the double-sided sheet inverting roller pair 2302 operate to invert the original sheet provided on the downstream side of the second read roller pair 2203 and direct the original sheet toward the image reading position A on the slit glass 198.

First, the original sheet fed from the original tray 2101 has its first surface continuously exposed to light while passing through the image reading position A on the slit glass 198 similar to the aforementioned single-sided original mode.

By rotating clockwise the reversing diverter pawl 2301 on the downstream side of the second read roller pair 2203 from the position indicated by the solid line, the conveyance path is switched, so that the original sheet whose first surface has undergone exposure is conveyed through the reversing switchback path 2305 to the double-sided sheet inverting roller pair 2302.

After the trailing end of the original sheet passes through a resin film 2304, the double-sided sheet inverting roller pair 2302 is reversely driven to convey the original sheet through the reversing path 2303 to the first read roller pair 2201. Subsequently, similar to the processing of the first surface of this original sheet, the leading end of the original sheet is pressed against the nip portion of the first read roller pair 2201, thereby forming and keeping an appropriate amount of loop. By stopping the driving, the registration of the leading end and the correction of the skewing of the original sheet are executed.

Subsequently, the driving of the first read roller pair 2201 and the second read roller pair 2203 is started, thereby exposing the second surface of the original sheet to light and reading the image similar to the aforementioned reading of the first surface.

It is to be noted that the reversing diverter pawl 2301 returns to the position indicated by the solid line at the time of reading the second surface of the original sheet. The double-sided sheet inverting roller pair 2302 continues to be driven until the original sheet passes through the nip portion thereof.

If the original sheet whose second surface has undergone the exposure is directly discharged onto the discharge tray 2502, then the first surface faces up, resulting in a change in the order of the original sheets. Therefore, in order to invert again the original sheet, the reversing diverter pawl 2301 is set back to the position of the solid line after the leading end of the original sheet passes through the second read roller pair 2203, and the discharge diverter pawl 2401 is turned clockwise from the position of the solid line. By this operation, the original sheet is conveyed through the regulation path 2404 to the discharge inverting roller pair 2402. After the trailing end of the original sheet passes through the resin film 2403, the discharge inverting roller pair 2402 is rotated in the reverse direction. Consequently, the original sheet is inverted along the regulation path 2404 by the resin film 2403 and discharged onto the discharge tray 2502 by the discharge roller pair 2501. With this arrangement, the original is discharged onto the discharge tray 2502 with the first surface facing down.

It is to be noted that the subsequent original sheet starts to be fed at the point of time when the trailing end of the original sheet whose second surface is currently being read passes through the registration sensor SE2.

In order to execute the above operation, the pickup roller 2102, the sheet feed roller 2103 and the separation roller 2104 are rotatively driven by a main motor M1 (not shown) while being able to be rotated forwardly and reversely via an electromagnetic clutch CL1 (not shown). The intermediate roller pair 2105 and the double-sided sheet inverting roller pair 2302 are directly driven by the main motor M1 while being able to be rotated forwardly and reversely.

When the intermediate roller pair 2105 is driven in the direction in which the original sheet is conveyed downward in FIG. 4, the double-sided sheet inverting roller pair 2302 is operatively connected in the direction in which the original sheet is conveyed upwardly leftward.

The first and second read roller pairs 2201 and 2203 are rotatively driven by a conveyance motor M2 (not shown).

The discharge roller pair 2501 and the discharge inverting roller pair 2402 are rotatively driven by a discharge motor M3 (not shown) while being able to be rotated forwardly and reversely.

When the discharge inverting roller pair 2402 is driven in the direction in which the original sheet is conveyed upwardly leftward in FIG. 4, the discharge roller pair 2501 is operatively connected in the direction in which the original sheet is conveyed upwardly rightward.

The reversing diverter pawl 2301 and the discharge diverter pawl 2401 are independently driven pivotally by a solenoid (not shown).

As described above, this automatic document feeder 20 is provided with a single-sided original mode and a double-sided original mode, which can be selected by the operator via the operation panel 30 (see FIG. 3). When a plurality of original sheets are set, the aforementioned original feed operation is repeated. When a setting number is set by the operator, the image data of each original sheet is read once by the optical system 11, and thereafter a transfer operation corresponding to the times of the set number is executed.

iii) Construction and operation of the sheet feed section

The original sheets to be fed are stacked on the original tray 2101 with the first page facing up in the uppermost position. If the start key 301 on the operation panel 30 is depressed, then the lift-up plate 2107 for lifting up the original sheet on the original tray 2101 is pivotally driven counterclockwise by a driving lever under the controll of a driving source (not shown) with its left end portion made to serve as a pivot point, thereby bringing the uppermost surface of the stacked original sheets in contact with the pickup roller 2102.

The pickup roller 2102 can swing around the pivot axis of the sheet feed roller 2103 by an arm 2116 and is urged counterclockwise by its own weight and a spring (not shown). The lift-up plate 2107 continues to pivot until an upper limit sensor SE15 detects a detection plate formed integrally with the arm 2116 after the pickup roller 2102 comes in contact with the uppermost surface of the original sheets on the pivoting lift-up plate 2107. In this stage, the pickup roller 2102 presses the original sheets with a specified pressure by its own weight and the aforementioned spring. After the start of the sheet feed operation, the state of the upper limit sensor SE15 is always monitored, and the lift-up plate 2107 is driven counterclockwise every occurrence of a non-detection state, so that the pickup roller 2102 is retained at a specified height regardless of the amount of stack of the original sheets. By this operation, the sheet feed pressure is consistently kept constant to maintain a stabilized conveyance force, so that an original sheet approach angle and height are maintained when the original sheet is rubbed by a pre-handling portion 2110a constituted by part of a handling holder 2110.

The pre-handling portion 2110a forms an ascending slope in the sheet feed direction from the plane of the leading end regulating portion of the sheet feed tray, and the upper end of the pre-handling portion 2110a is located close to the nip portion of the sheet feed roller 2103 and the separation roller 2104 with interposition of a small gap. When a plurality of original sheets are fed in accordance with the rotation of the pickup roller 2102, the leading ends of the original sheets abut against the pre-handling portion 2110a. In this case, the original sheets located in the upper layer advance in position, and a small number of original sheets pass over the pre-handling portion 2110a.

Subsequent to the positioning of the pickup roller 2102, the main motor M1 and the electromagnetic clutch CL1 are turned on to execute the aforementioned sheet feeding and registering operations. It is to be noted that the pickup roller 2102 receives a driving force from the sheet feed roller 2103 and rotates integrally with the sheet feed roller 2103. In the case of conveyance by the first and second read roller pairs 2201 and 2203, the electromagnetic clutch CL1 is turned off. In order to reduce the driven resistance in this case, the pickup roller 2102 and the sheet feed roller 2103 are mounted via a one-way clutch on the axis of rotation. The separation roller 2104 is rotatably held by the handling holder 2110 and is brought in pressure contact with the sheet feed roller 2103 via the handling holder 2110 by a spring (not shown). This separation roller 2104 is provided with a torque limiter, and the torque is set to a value with which the separation roller is driven to rotate clockwise upon receiving a friction force from the original sheet in the case where one original sheet exists between the separation roller 2104 and the sheet feed roller 2103 when the sheet feed roller 2103 is rotating. The sheet feed roller 2103 stops when a plurality of original sheets exist, thereby preventing the original sheets below the uppermost sheet from advancing to the downstream side.

iv) Detection of original size

This automatic document feeder 20 is provided with an original size detector for detecting the original size immediately after the start of the sheet feed operation in order to effectively rapidly execute various copying processes in the main body 10.

That is, a plurality of original sensors SE11 and SE12 are arranged in different positions with regard to the original conveyance direction in the vicinity of the end portion of the original tray 2101. This arrangement allows the original sheets set on the original tray 2101 to be classified into a plurality of types in terms of length in the conveyance direction. It is to be noted that the original sheet length in the conveyance direction can be determined not only on the original tray 2101 but also on the basis of a relation between the detection time of the original sensor arranged on the conveyance path and the original conveyance velocity.

A plurality of sensors SE6 and SE7 are arranged as original sensors in different positions with regard to the direction perpendicular to the original sheet conveyance direction on the downstream side of the sheet feed roller 2103. When the original sheet set on the original tray 2101 passes, the sensor SE6 is provided in a position for securely detecting the original sheet via the attached lever 2109, while the sensor SE7 is provided in a position for detecting the original sheet only when the wide original sheet passes. This arrangement allows the plurality of original sheets to be classified into a plurality of types in terms of width.

By thus detecting the length in the conveyance direction of the original sheet and the width in the direction perpendicular to the conveyance direction, the original sheet size can be determined.

With the provision of the sensors SE6 and SE7 on the immediate downstream side of the sheet feed roller 2103, and therefore, the size of the original sheet to be subjected to the next image reading can be known immediately after the start of the sheet feed operation of the original sheet. Therefore, a waiting time until the start of the feeding of a sheet from the sheet supply cassette in the main body 10 can be reduced. Therefore, the first copying time can be reduced to allow the productivity to be improved.

When executing sorting, processing in a 2-in-1 mode (a mode in which copying is executed with two original images arranged on one sheet), processing in a 4-in-1 mode (a mode in which copying is executed with four original images arranged on one sheet) or the like using the read images in the main body 10, it is required to store the image information into a memory and process the information. However, since the memory is expensive, it is often unreasonable to mount a memory having a capacity sufficient for executing such a variety of processing operations. However, according to this automatic document feeder 20, the original size can be determined before the start of the image reading, and therefore, the various processing operations can be executed with the necessary-minimum memory capacity without degrading the productivity with regard to the original document.

v) Construction and operation of the reading section

The first read roller pair 2201 is located on the upstream side of the image reading position A on the slit glass 198. The original sheet fed from the intermediate roller pair 2105 has its leading end pressed against the nip portion of the first read roller pair 2201 that is stopping. Then, the intermediate roller pair 2105 stops its operation while forming and keeping an appropriate amount of loop of the original sheet, thereby registering the leading end of the original sheet.

The reading pressure guide 2202 is arranged opposite to the slit glass 198 with a specified interval (assumed to be slightly wider than the thickness of one original sheet that is passing) maintained with respect to the slit glass 198. As is known, in order to obtain a copy of a high quality, it is required to convey the original sheet at the set constant velocity in the image reading position A and convey the original sheet in close contact with the slit glass 198 so as not to displace the original sheet from the focusing position of the optical system 11. This reading pressure guide 2202 guides the original sheet fed from the first read roller pair 2201 and urges the original sheet against the slit glass 198. Therefore, the original image is read with high accuracy through the slit glass 198 by the optical system 11 of the main body 10. In order to further ensure this effect, a resin film or the like may be elastically slightly pressed against the slit glass 198 from the reading pressure guide 2202.

The original sheet whose image has been read through the image reading position A on the slit glass 198 is conveyed to the second read roller pair 2203 by the scoop guide 199.

The first and second read roller pairs 2201 and 2203 are rotated in synchronization with each other by transmitting a driving force from the single conveyance motor M2 by way of one pulley belt. This arrangement keeps the synchronism in the conveyance velocity of the first and second read roller pairs 2201 and 2203 and allows the prevention of the vibration of the rollers due to the inevitable looseness of the gear drive. Therefore, the constant-velocity conveyance characteristic of the rollers can be maintained, so that the image to be copied can be stably read. The read roller pairs 2201 and 2203 are driven independently of the other conveyance systems, and therefore, noises ascribed to fluctuations in driving loads from the other components can be interrupted to allow the constant-velocity conveyance characteristic of the rollers to be further improved.

The outer diameters of the first and second read roller pairs 2201 and 2203 are normally made identical to each other (for the identical conveyance velocity), and this arrangement is the best. However, if the conveyance velocity of the second read roller pair 2203 becomes slower than the conveyance velocity of the first read roller pair 2201, then the original sheet slacks on the slit glass 198 to influence the image with the disadvantageous effects of the displacement of the original sheet surface relative to the focusing position of the optical system 11 or the hopping of the original sheet. Therefore, the conveyance velocity of the second read roller pair 2203 must be kept equal to or higher than the conveyance velocity of the first read roller pair 2201.

The first and second read roller pairs 2201 and 2203 have their upstream rollers used as the driving rollers and the downstream rollers used as the driven rollers in FIG. 4. The driven rollers have an advantage with regard to the original sheet slip when they are forcedly driven by a gear or the like from the driving rollers. By contraries, there is generated a fluctuation in driving load due to the impact on the gear teeth surfaces, consequently causing a disadvantageous fluctuation in the original sheet conveyance velocity. For the above reasons, the driven rollers are driven by the frictions with the driving rollers and the original sheet.

Each driving roller is formed of a rubber material (EPDM or PUR, for example) of a high frictional coefficient. In order to prevent the fluctuation in the peripheral velocity ascribed to a change in the amount of deformation of the driving roller due to a fluctuation in the pressure force of the driven roller and the eccentricity of the driven roller, the rubber hardness of the driving roller is set relatively high (about 70 to 90 degrees). The inter-molecular bonding strength of the rubber becomes strong when the rubber hardness of the driving roller is increased, and accordingly, there is the further effect of suppressing the change in the outer diameter due to a variation in the environmental temperature. In regard to this point, the change in the peripheral velocity can be prevented. Therefore, a variation in the copying magnification ratio can be prevented.

The driven roller of the second read roller pair 2203 is formed of a material (POM, for example) having a relatively low frictional coefficient. As a result, if the leading end of the original sheet conveyed by the first read roller pair 2201 collides against the outer peripheral surface of the driven roller on the upstream side of the nip point, then the leading end of the original sheet is smoothly guided to the nip without stopping.

A degradation of image due to the slackening and hopping of the original sheet tends to occur when a clearance of the guide of the reading conveyance path 2207 between the first read roller pair 2201 and the second read roller pair 2203 is large, when a difference in height between the downstream end portion of a first read guide 2204 and the upper surface of the slit glass 198 is large, when an angle of approach from the first read guide 2204 to the slit glass 198 is steep or when an angle of approach from the slit glass 198 to the scoop guide 199, an angle of approach from the scoop guide 199 to a second read guide 2205 or an angle of approach to the second read roller pair 2203 is steep. For the above reasons, it is required to make the angle of approach from the surface of the slit glass 198 to each portion as small as possible and reduce the length of the conveyance path between the first read roller pair 2201 and the second read roller pair 2203 as short as possible for the achievement of a smooth guide shape.

When the leading end of the original sheet is conveyed only by the first read roller pair 2201, the leading end of the original sheet is not smoothly conveyed due to the contact resistance to the guide surface, and the conveyance velocity becomes unstable. Therefore, it is required to reduce the conveyance resistance by slightly widening a guide clearance immediately after the passing of the reading pressure guide 2202.

vi) Conveyance control in the reading section

As described above, after the first read roller pair 2201 registers the leading end of the original sheet, the main motor M1 and the conveyance motor M2 start to be driven in synchronism. It is required to drive the intermediate roller pair 2105 and the first read roller pair 2201 while keeping the loop of the original sheet formed between both the rollers at the start of the driving. Therefore, the conveyance velocity of the intermediate roller pair 2105 must be set to a velocity equal to or higher than the conveyance velocity of the first read roller pair 2201.

If the copying magnification ratio is changed, the conveyance velocities of the first and second read roller pairs 2201 and 2203 vary in inverse proportion to the copying magnification ratio. That is, assuming that the copying magnification ratio is M and the conveyance velocity of the read roller pairs 2201 and 2203 at the equal magnification ratio is V, then a conveyance velocity $V_M$ of the read roller pairs 2201 and 2203 at the copying magnification ratio M is automatically set to:

$$V_M = V/M.$$

Therefore, the conveyance velocity $V_N$ of the intermediate roller pair 2105 is automatically set to a range of:

$$V_N \leq V_M$$

while being interlocked with the above setting.

The above relation of the conveyance velocity prevents the noise clutches of the other drive systems, the turning-on and -off of driving, a load in pulling out the trailing end of the original sheet from the handling section and so on from influencing the read roller pairs 2201 and 2203 and from consequently impairing the constant conveyance velocity as described above when the original sheet is conveyed while being held between the nips of both the read roller pairs 2201 and 2203 and the other rollers to cause a tension applied to the original sheet without slackening.

The above relation of the conveyance velocity is also set similarly between the double-sided sheet inverting roller pair 2302 and the read roller pairs 2201 and 2203.

vii) Positional relation and relation of conveyance velocity between the sections of the automatic document feeder 20

Figure 5:
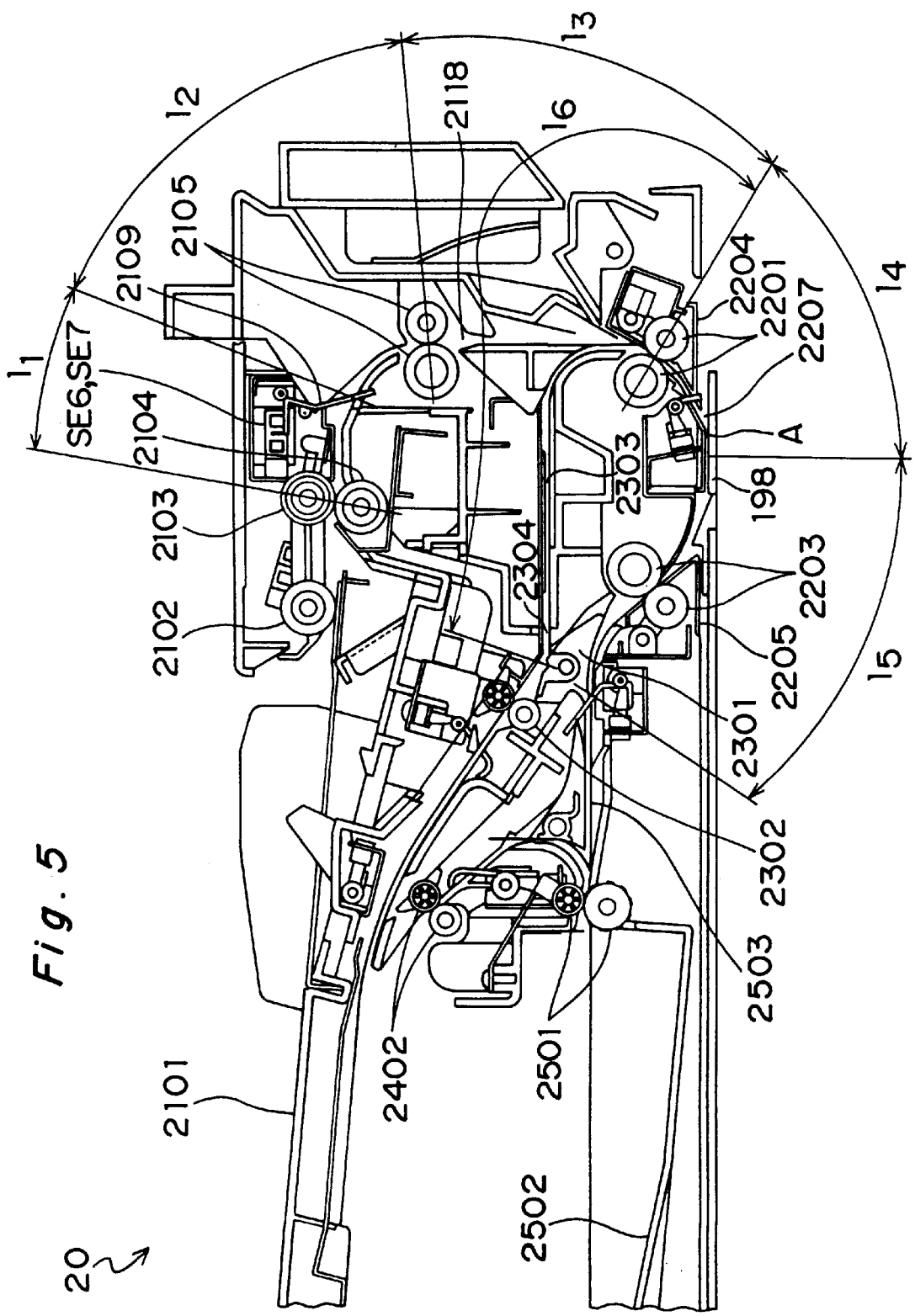
FIG. 5 is a view for explaining a distance of conveyance of the above automatic document feeder.

This automatic document feeder 20 has the following positional relation and relation of conveyance velocity between the sections in order to improve the productivity in reading the original document per unit time. In this case, as shown in FIG. 5, it is assumed that:

a conveyance distance between the sheet feed roller 2103 and the (lever 2109) of the sheet feed sensor SE6 is $l_1$;

a conveyance distance between the sheet feed sensor SE6 and the intermediate roller pair 2105 is $l_2$;

a conveyance distance between the intermediate roller pair 2105 and the first read roller pair 2201 is $l_3$;

a conveyance distance between the first read roller pair 2201 and the image reading position A is $l_4$;

a conveyance distance between the image reading position A and the resin film 2304 is $l_5$; and a conveyance distance between the resin film 2304 and the first read roller pair 2201 is $l_6$.

It is further assumed that:

a conveyance velocity of the sheet feed roller pairs 2102 and 2103 (driven by the main motor M1 (not shown) via the electromagnetic clutch CL1 (not shown)) is $V_{01}$;

conveyance velocities in the sheet feeding stage and the reading stage of the intermediate roller pair 2105 (directly driven by the main motor M1) are $V_{02}$ and $V_{03}$ respectively;

conveyance velocity of the read roller pairs 2201 and 2203 (directly driven by the conveyance motor M2 (not shown)) is $V_{04}$;

conveyance velocities in the reading stage and the conveying stage of the double-sided sheet inverting roller pair 2302 (directly driven by the main motor M1) are $V_{05}$ and $V_{06}$, respectively;

conveyance velocities in the reading stage and the conveying stage of the discharge inverting roller pair 2402 (directly driven by the discharge motor M3 (not shown)) are $V_{07}$ and $V_{08}$, respectively; and conveyance velocities in the reading stage, the sheet feeding stage and the conveying stage of the discharge roller pair 2501 (directly driven by the discharge motor M3) are $V_{09}$, $V_{10}$ and $V_{11}$, respectively.

These conveyance velocities are set so that:

$$V_{01} = V_{02};$$

$$V_{03} = V_{04} = V_{05} = V_{07} = V_{09};$$

and $$V_8 = V_{10}.$$

I) Relation of conveyance velocity in one-side mode

The first original sheet is registered while being fed as described above, and subsequently this first original sheet is subjected to a read operation at the velocity $V_{04}$ of the read roller pairs 2201 and 2203 by the driving of the conveyance motor M2. In this stage, the main motor M1 is also driven at the velocity $V_{03}$ of the intermediate roller pair 2105. At least before the leading end of the original sheet reaches the discharge roller pair 2501, the discharge motor M3 is driven at the velocity $V_{09}$ of the discharge roller pair 2501. In the case where the second original sheet exists, the conveyance motor M2 and the discharge motor M3 are turned off in accordance with the timing immediately after the passing of the trailing end of the first original sheet through the image reading position A, and the first original sheet stops in the position. On the other hand, when the trailing end of the first original sheet is detected by the sheet feed sensor SE6, the electromagnetic clutch CL1 is turned on to change the velocity of the main motor M1 to the velocity $V_{01}$ of the pickup roller 2102 and the sheet feed roller 2103, and the second original sheet starts to be fed. The second original sheet is registered at the nip of the first read roller pair 2201 that is stopping, similar to the first original sheet. If the interval between the time when the trailing end of the first original sheet reaches the rear end of the image reading position A and the time when the leading end of the second original sheet reaches the first read roller pair 2201 is to be minimized, assuming that the length of the original sheet is Lp, then the substantial read time t per original sheet is:

$$t = (Lp + l_4)/V_{04}.$$

By making the conveyance distance $l_4$ as short as possible and making the left side and the right side of the following expression (a):

$$l_4/V_{O4} < \{(l_1+l_2)/V_{O1}+l_3/V_{O2}\} \quad (a)$$

mutually as equal as possible, the time t limitlessly comes close to $t=Lp/V_{O4}$. Therefore, a high productivity can be achieved with regard to the reading of the original document.

The velocity of the read roller pairs 2201 and 2203 becomes slower as the copying magnification ratio M increases, and this possibly causes the case where the original sheet that is currently being read and the original sheet that is currently being fed overlap each other, failing in satisfying the expression (a). However, the interval (expressed by $(l_2+l_3+l_4)/V_{O4}$) between the time when the trailing end of the original sheet that is currently being read passes through the registration sensor SE6 and the time when it reaches the image reading position A is already known. Therefore, the read time t can be minimized by reducing the velocity of the pickup roller 2102, the velocity $V_{O1}$ of the sheet feed roller 2103 and the velocity $V_{O2}$ of the intermediate roller pair 2105 so as to satisfy the expression (a) or by delaying the timing of turning on the electromagnetic clutch CL1 by the difference between the left side and the right side of the expression (a) when the right side of the expression (a) becomes smaller the left side.

Next, simultaneously with the start of the conveyance of the second original sheet by the first read roller pair 2201, the first original sheet is conveyed by the discharge roller pair 2501 toward the discharge tray 2502. The velocity of the discharge roller pair 2501 in this stage is maintained at the velocity $V_{O9}$ since the distance between the trailing end of the first original sheet and the leading end of the second original sheet coincides with the conveyance distance $l_4$ and takes the minimum value as described above.

The velocity of the read roller pairs 2201 and 2203 increases as the copying magnification ratio M reduces, and therefore, the regulation state of the original sheet on the discharge tray 2502 becomes degraded if the original sheet is discharged by the discharge roller pair 2501 at this velocity. Therefore, in the case where the conveyance is attained by only the discharge roller pair 2501, the original sheet is discharged by changing the velocity to the velocity $V_{10}$ slower than the velocity $V_{O9}$ in the reading stage.

II) Relation of conveyance velocity in the double-sided original sheet mode

The first original sheet is registered similar to the aforementioned one-side mode, and subsequently, the read operation of the first surface of the first original sheet is executed. In this stage, the reversing diverter pawl 2301 is driven clockwise from the position of the solid line. The conveyance motor M2 is driven at the velocity $V_{O4}$ of the read roller pairs 2201 and 2203, while the main motor M1 is driven at the velocity $V_{O3}$ of the intermediate roller pair 2105 and the velocity $V_{O5}$ of the double-sided sheet inverting roller pair 2302. When the trailing end of the first original sheet passes through the second read roller pair 2203, the velocity of the main motor M1 is changed so that the double-sided sheet inverting roller pair 2302 comes to have a velocity $V_{O6}$, or the maximum velocity, and the conveyance motor M2 is stopped. Subsequently, in accordance with the timing at which the trailing end of the first original sheet passes through the resin film 2304, the driving of the main motor M1 is reversed while keeping the velocity $V_{O6}$ of the double-sided sheet inverting roller pair 2302. The first original sheet is registered at the nip of the first read roller pair 2201 that is stopping, similar to the sheet feeding stage. Then, the main motor M1 is turned off. The timing at which the conveyance velocity is changed may occur at the point of time when the first original sheet passes through the image reading position A. Subsequently, in order to execute the read operation of the second surface similar to the first surface of the first original sheet, the conveyance motor M2 is driven at the velocity $V_{O4}$ of the read roller pairs 2201 and 2203, while the main motor M1 is driven at the velocity $V_{O5}$ (also in the reverse direction) of the double-sided sheet inverting roller pair 2302. The reversing diverter pawl 2301 is driven to move into the position of the solid line. In this case, a conveyance distance $(l_5+l_6)$ is set as short as possible in terms of the construction of the conveyance path. This arrangement suppresses a loss time due to the conveyance of one original sheet for the reading of both the surfaces.

The first original sheet whose second surface has undergone the reading stops immediately after its trailing end reaches the image reading position A in terms of timing, similar to the one-side mode. When the trailing end of the first original sheet passes through the registration sensor SE2 through the preceding processes, the electromagnetic clutch CL1 is connected to start the sheet feeding operation of the second original sheet. By this operation, a loss time from the completion of the reading of the second surface of the first original sheet to the start of the reading of the first surface of the second original sheet is suppressed. Assuming that the timing of the start of sheet feeding of the second original sheet can be expressed by a point of time ($\{Lp-(l_2+l_3)\}/V_{O4}$) when the trailing end of the first original sheet whose second surface is currently being read reaches the position of the conveyance distance $(l_2+l_3)$ from the first read roller pair 2201, then the same productivity as in the one-side mode can be achieved.

The control of the conveyance velocity for the original sheets subsequent to the second original sheet is similar to the control of the conveyance velocity for the second original sheet.

viii) Construction for jam processing

In the case where the original sheet jams during the conveyance or the original sheet is left inside the conveyance path due to a trouble on the main body 10 side, the automatic document feeder 20 is provided with a mechanism for removing the left original sheet, and the mechanism will be described.

Figure 6:
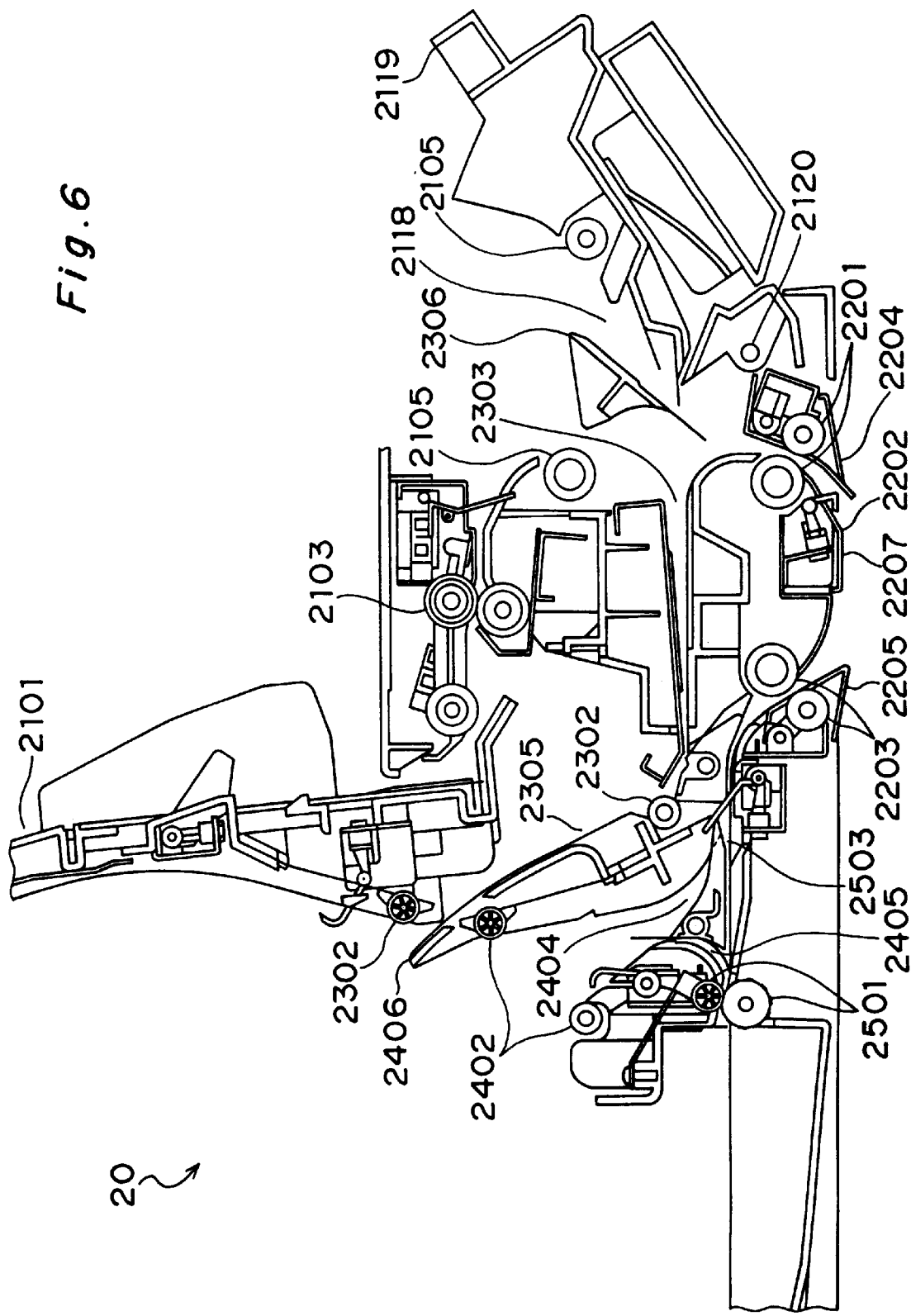
FIG. 6 is a view showing a state in which each conveyance path of the above automatic document feeder is open.

As shown in FIG. 6, the sheet-feeding conveyance path 2118 can be made open by turning a right-hand cover 2119 around a hinge 2120. In this case, the nip of the intermediate roller pair 2105 is also separated apart. Further, part of the reversing path 2303 is made open by turning a guide 2306 around the hinge 2120.

By further turning the automatic document feeder 20 around a hinge 2801 (see FIG. 2) relative to the main body 10, the reading pressure guide 2202 and the slit glass 198 are separated apart from each other, thereby opening part of the reading conveyance path 2207. The first and second read guides 2204 and 2205 are made open while releasing the pressure contact with the first and second read roller pairs 2201 and 2203.

The reversing switchback path 2305 is exposed to the outside by opening the original tray 2101. At the same time, the pressure contact of the double-sided sheet inverting roller pair 2302 (whose driven roller is mounted on the original tray 2101 side) is also released.

The regulation path 2404 and the regulation discharge path 2405 are exposed to the outside by opening a guide 2406 after opening the original tray 2101.

Wherever the original sheet stays in the eight conveyance paths inside the automatic document feeder 20, the operator is able to confirm the position where the original sheet stays and to easily seize at least one end of the original sheet by opening the components of the automatic document feeder 20. Therefore, the operator can easily take the original sheet out of the automatic document feeder 20 without imposing any damage on the original sheet.

(3) The overall operation in an original insertion mode will be described next.

This copying machine obviates the need for passing the original sheet through the image reading position A only for the detection of the original size by virtue of the provision of the "original insertion mode" described as follows, thereby suppressing the reduction in productivity.

Figure 8:
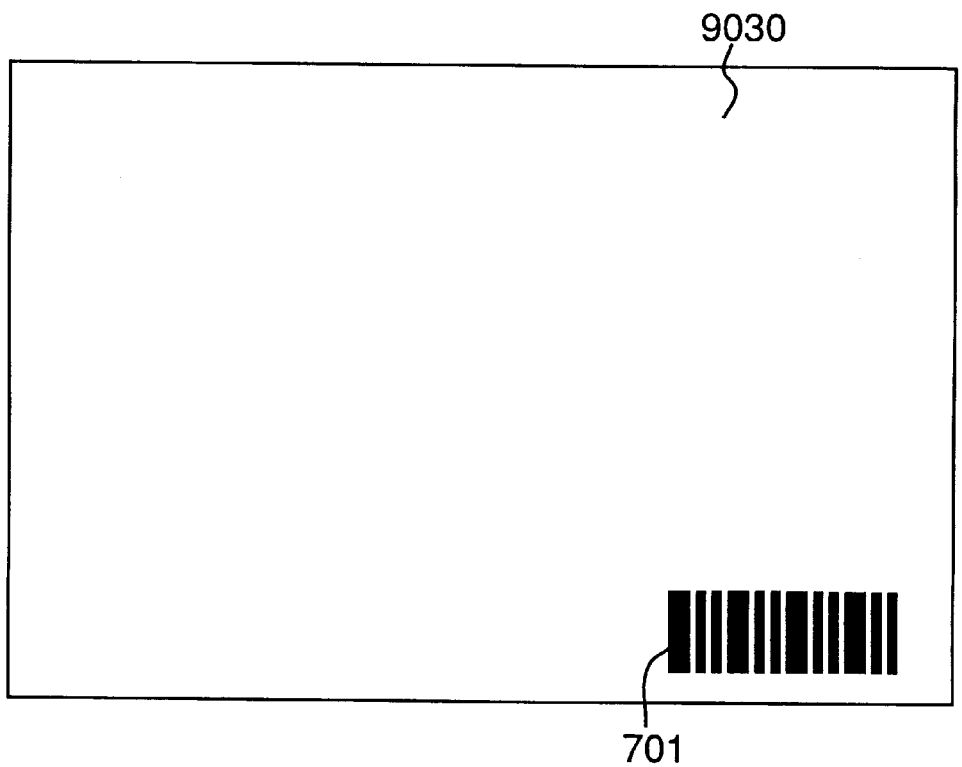
FIG. 8 is a view showing an insertion sheet.
Figure 9A:
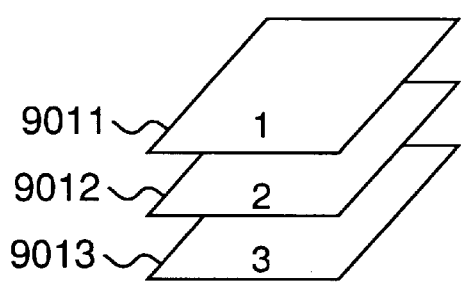
FIGS. 9A, 9B, 9C and 9D are schematic views showing original sheet groups to be prepared by the operator in an original insertion mode and a print group obtained by executing copying.
Figure 9B:
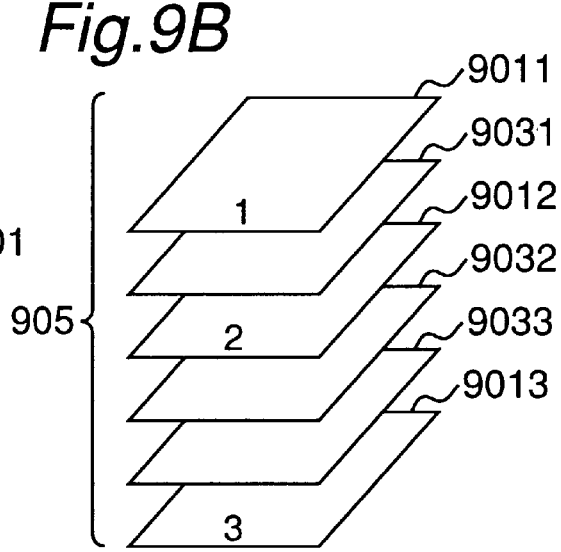
Figure 9C:
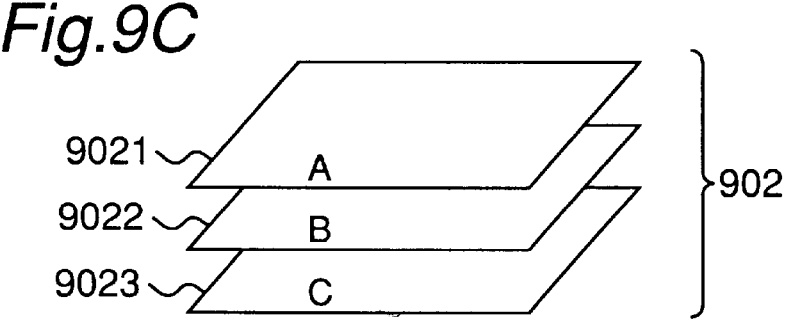
Figure 9D:
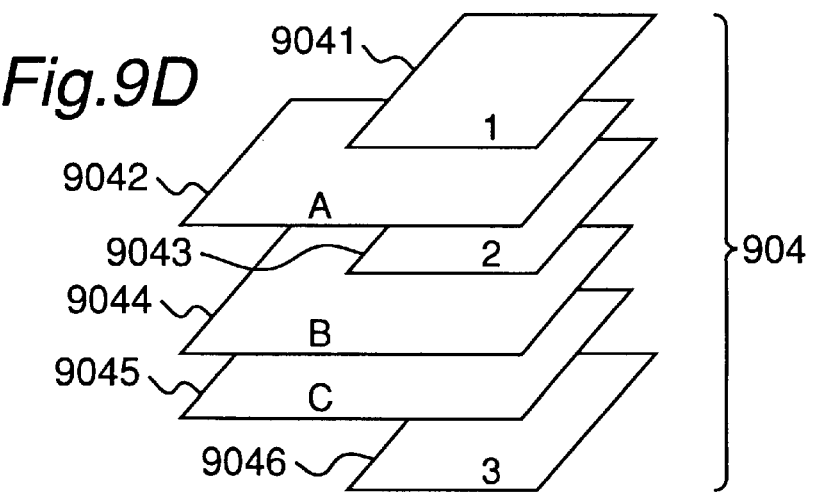

FIGS. 9A–9D show a group of sheets to be prepared by the operator in this original insertion mode and a group of prints obtained by executing this copying process. First, as shown in FIGS. 9A and 9B, it is assumed that a first original sheet group 901 comprised of original sheets 9011, 9012 and 9013 of an identical size and a second original sheet group 902 comprised of original sheets 9021, 9022 and 9023 of an identical size different from the original sheet size of the first original sheet group 901 exist. For the sake of convenience, the original sheets 9011, 9012 and 9013 of the first original sheet group 901 carry thereon the images of "1", "2" and "3", respectively, while the original sheets 9021, 9022 and 9023 of the second original sheet group 902 carry thereon the images of "A", "B" and "C", respectively. As shown in FIG. 9B, prior to the execution of copying by this copying machine, the operator prepares a group of original sheets 905 (referred to as a "composite original sheet group" hereinafter) in which insertion sheets 9031, 9032 and 9033 of the same size as that of the first original sheet group 901 are inserted between the desired pages of the first original sheet group 901. The operator can insert these insertion sheets 9031, 9032 and 9033 into the first original sheet group 901 when determining the position of insertion of the original sheets 9021, 9022 and 9023 of the second original sheet group 902, thereby allowing the inserting work to be surely achieved in a short time. As shown in FIG. 8, the insertion sheets 9031, 9032 and 9033 (collectively denoted by the reference numeral "9030") are each provided with a discrimination pattern 701 for discriminating the insertion sheet 9030 from the proper original sheets 9011, 9012 and 9013 (collectively denoted by the reference numeral "9010"). As shown in FIG. 9D, in this original insertion mode, a print group 904 in which prints 9042, 9044 and 9045 corresponding to the second original sheet group 902 are inserted between the desired pages of prints 9041, 9043 and 9046 corresponding to the first original sheet group 901 can be obtained.

Figure 7:
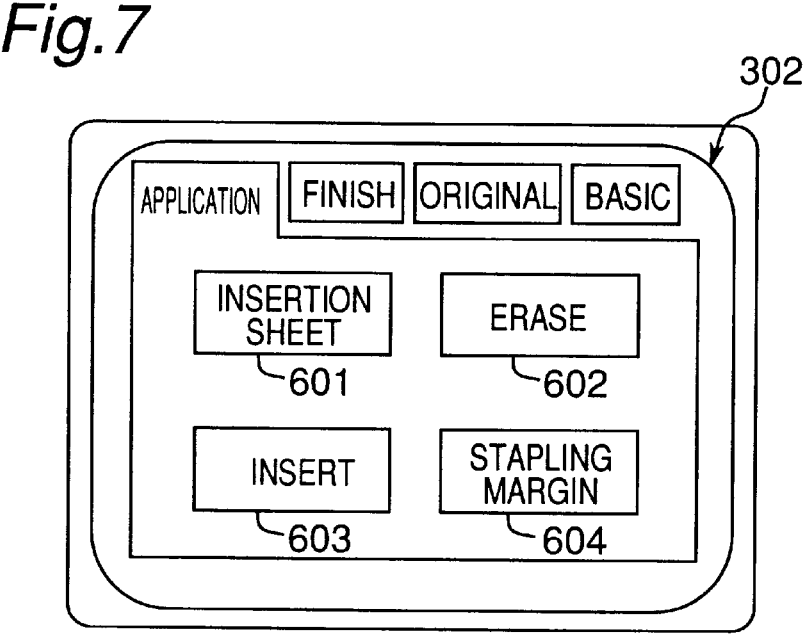
FIG. 7 is a view showing a sub-menu screen displayed on the touch panel of the above operation panel.

FIG. 7 shows a display in the case where the operator selects the original insertion mode via the operation panel 30. If the operator presses the application button 314 (see FIG. 3) while the initial screen is displayed on the LCD touch panel 302, then the display screen is changed to the sub-menu screen shown in FIG. 7. On this sub-menu screen, there are shown an insertion sheet button 601 for selecting an insertion sheet mode, an erase button 602 for setting the width of erasing, an insertion button 603 for selecting the original insertion mode and a stapling margin button 604 for providing each copy with a stapling margin. If the operator presses the insertion button 603, then the operation mode of this copying machine is set to the original insertion mode.

I) First operation example

A first operation example in the original insertion mode will be described with reference to the flowcharts of FIG. 10, FIG. 11 and FIG. 12. This first operation example is an example in which the composite original sheet group 905 and the second original sheet group 902 are separately set on the original tray 2101 and the original images of the original sheet groups 905 and 902 are taken in movement through the slit glass 198.

Figure 10:
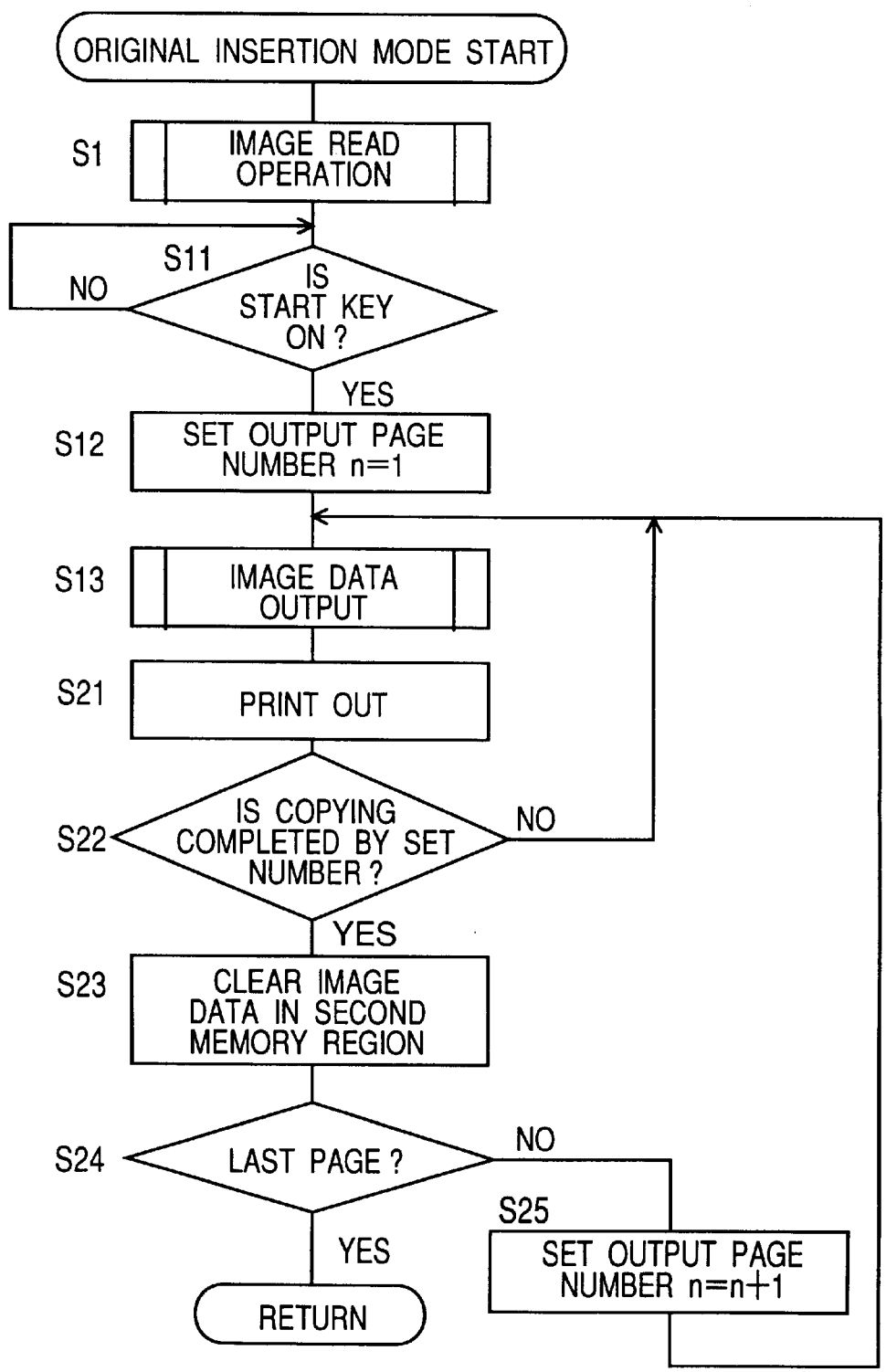
FIG. 10 is a flowchart of a first operation example in the original insertion mode of the above copying machine.

The image processing section 12 shown in FIG. 1 is provided with a first memory region for storing therein the image data of the first original sheet group 901, a second memory region for storing therein the image data of the second original sheet group 902 and a third memory region for storing therein a variable, although they are not shown.

i) If the start key 301 is turned on in a state in which the original insertion mode is set, then the image read operation starts (S1 in FIG. 10).

Figure 11:
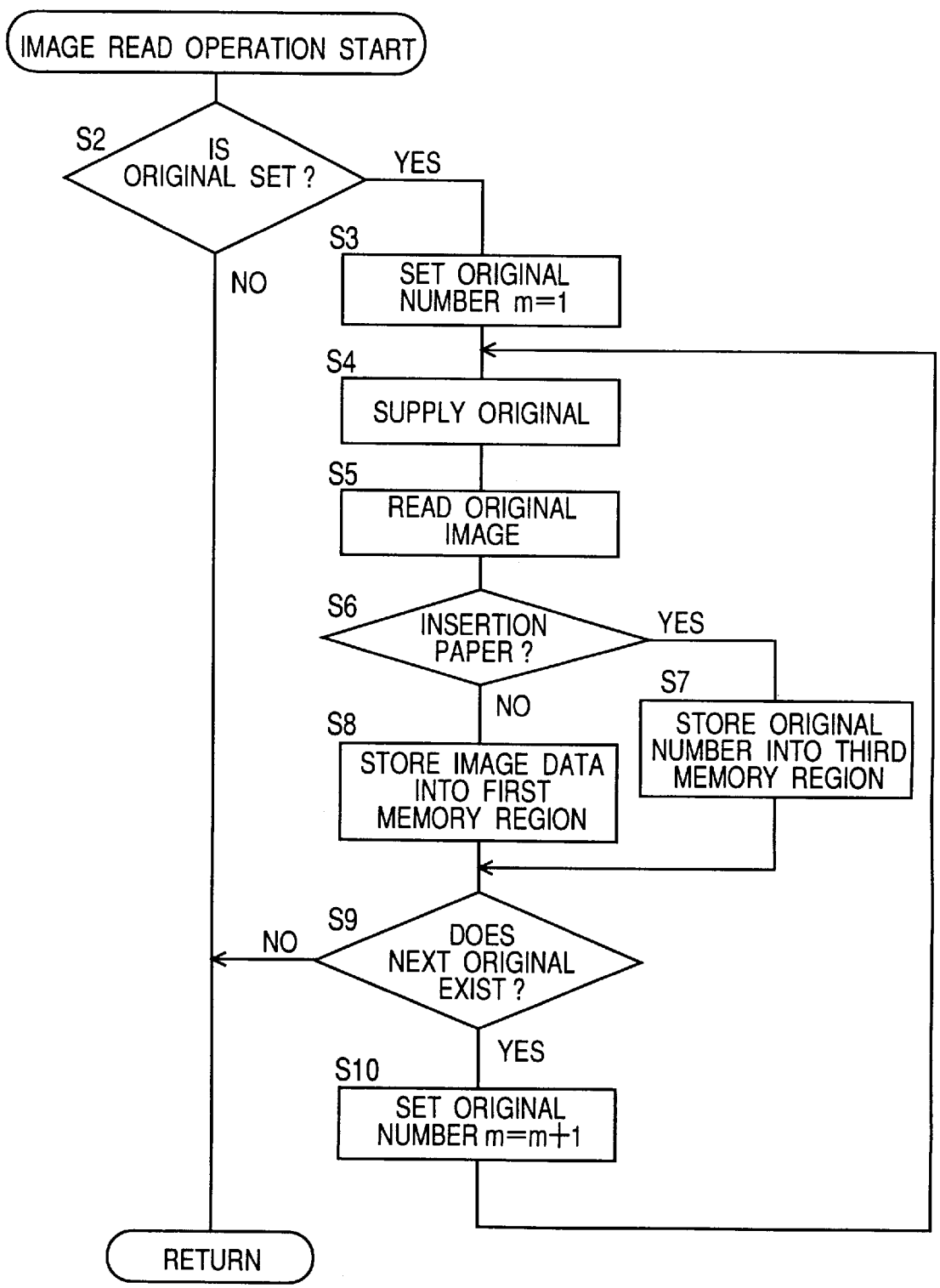
FIG. 11 is a flowchart of an image read operation in the above first operation example.

In detail, it is first decided whether or not an original sheet is set on the original tray 2101 by the original loading sensor SE1 of the automatic document feeder 20 (S2 in FIG. 11). It is now assumed that the composite original sheet group 905 is set.

If the composite original sheet group 905 is set, then the variable (original sheet number) m corresponding to the page of the original sheet (or insertion sheet) that is currently being read is set to one (S3). It is to be noted that this original sheet number comes from the consecutive paging numbers of the original sheets of the composite original sheet group 905 including the insertion sheets. Then, the first original sheet is fed from the original tray 2101 through the sheet-feeding conveyance path 2118 to the image reading position A on the slit glass 198, or the image reading position for taking the original image in movement inside the reading conveyance path 2207 (S4). In this stage, the original sheet size of the composite original document sheet group 905, i.e., the original sheet size of the first original sheet group 901 can be determined by the sensors SE11 and SE2 mounted on the original tray 2101 and the sensors SE6 and SE7 provided on the immediate downstream side of the sheet feed roller 2103.

Next, the image of the original sheet fed to the image reading position A on the slit glass 198 is read by the optical system 11 of the main body 10 (S5), and it is decided whether the image data belongs to the proper original sheet 9010 or to the insertion sheet 9030 by means of the image processing section 12 (S6). In this case, the proper original sheet 9010 can be discriminated from the insertion sheet 9030 on the basis of the presence or absence of the discrimination pattern 701 shown in FIG. 8.

In the case where the sheet fed to the image reading position A on the slit glass 198 is the insertion sheet 9030, the value of the variable m corresponding to the original sheet number is stored into the third memory region inside the image processing section 12 (S7). In the case where the sheet fed to the image reading position A on the slit glass 198 is the proper original sheet 9010, the image data of the sheet is stored into the first memory region inside the image processing section 12 (S8).

If the process in step S7 or S8 is completed, then it is decided whether or not there is existing the next original sheet (or the insertion sheet) on the original tray 2101 (S9). In the case where the next original sheet exists, the value of the variable m is incremented by one (+1) (S10), and the original sheet is fed from the original tray 2101 to the image reading position A on the slit glass 198 (S4). Then, the processes from this step S4 to the step S10 are repeated until the original tray 2101 has run out of the composite original sheet group 905. Through these processes, the image data of the proper original sheet 9010 that have been included in the composite original sheet group 905 are successively accumulated in the first memory region inside the image processing section 12.

ii) If the reading of the composite original sheet group 905 is entirely completed, then the operator sets the second original sheet group 902 on the original tray 2101.

The program flow waits for the turning-on of the start key 301 by the operator (S11 in FIG. 10), and upon turning on the start key 301, the value of a variable (output page number) n corresponding to the page of the print (copy) to be formed is set to one (S12).

iii) Subsequently, image data is outputted by the image processing section 12 (S13).

Figure 12:
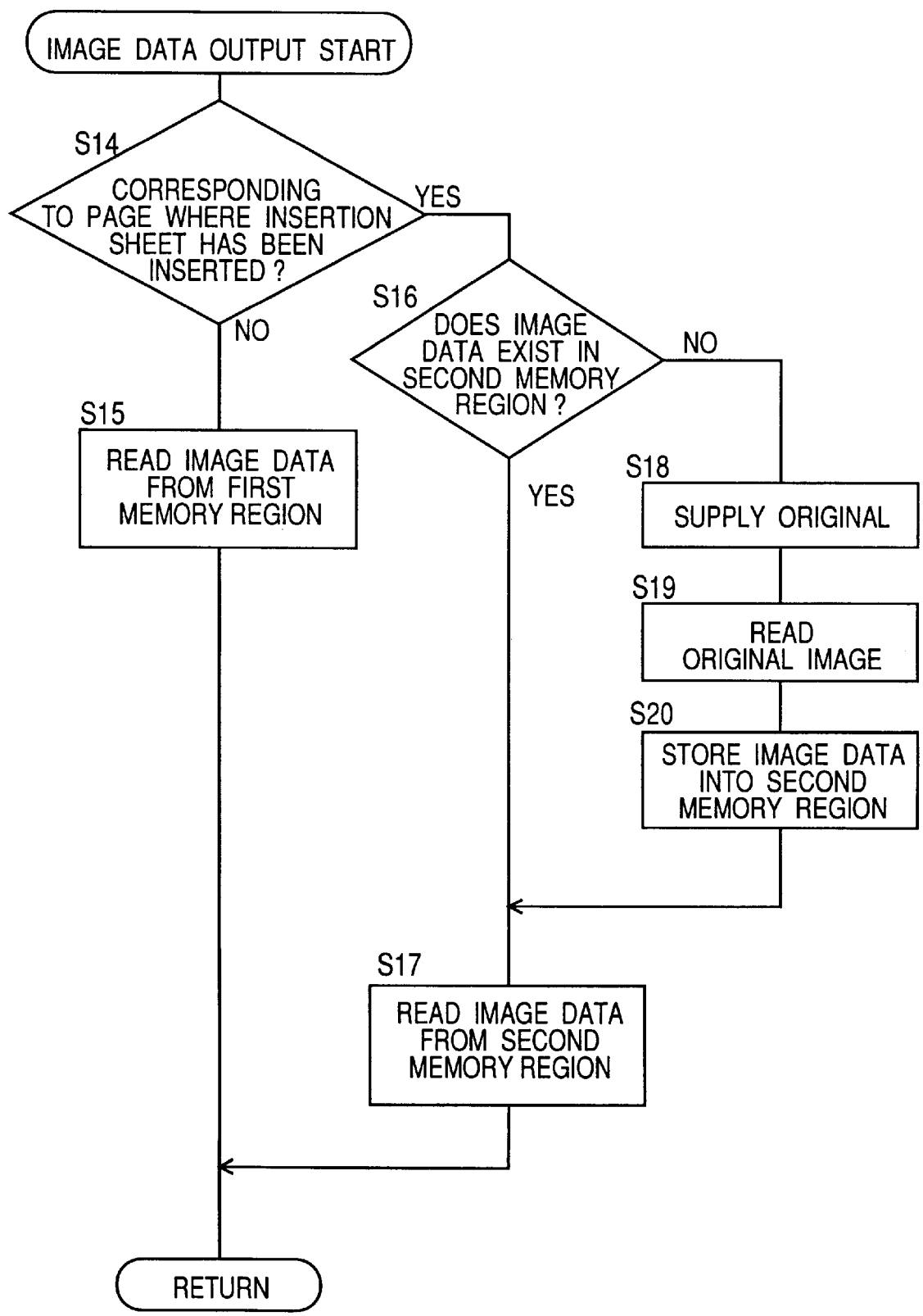
FIG. 12 is a flowchart of an image data output operation in the above first operation example.

In detail, as shown in FIG. 12, first, the value of the variable m corresponding to the position of the insertion sheet 9030 stored in the third memory region in step S7 of FIG. 11 is read, and the value of the variable n and the value of the variable m are compared with each other, thereby determining whether or not the page to be outputted this time corresponds to the page in which the insertion sheet has been inserted (S14 in FIG. 12).

In the case where the value of the variable n is different from the value of the variable m in step S14, the page to be outputted this time corresponds to the page of the proper original sheet 9010. Therefore, the image data of one page to be outputted this time is read from the first memory region inside the image processing section 12 in which the image data has been stored in step S8 of FIG. 11 (S15 in FIG. 12).

iv) Subsequently, in the printer section P, a sheet of the size identical to the original sheet size of the first original sheet group 901 is supplied from either one of the sheet supply cassettes 151, 152 and 153 to the photoreceptor drum 121, and the read image data is transferred onto the sheet for image formation. The obtained print is discharged onto the copy tray 190 (S21 in FIG. 10). Then, it is decided whether or not the copying of sheets has been completed by the set number, and the processes in steps S14, S15 and S21 are repeated until the copying of sheets is completed by the set number (S22 in FIG. 10).

v) In the case where the value of the variable n coincides with the value of the variable m in step S14 in FIG. 12, the page to be outputted this time corresponds to the page of the insertion sheet 9030. Therefore, after confirming that no image data exists in the second memory region inside the image processing section 12 (S16), the first original sheet of the second original sheet group 902 set on the original tray 2101 is fed from the original tray 2101 through the sheet-feeding conveyance path 2118 to the image reading position A inside the reading conveyance path 2207 on the slit glass 198 (S18). In this stage, the original size of the second original sheet group 902 can be determined by the sensors SEll and SE2 mounted on the original tray 2101 and the sensors SE6 and SE7 provided immediately on the downstream side of the sheet feed roller 2103.

Next, the image of the original sheet fed to the image reading position A on the slit glass 198 is read by the optical system 11 of the main body 10 (S19), and the image data is once stored into the second memory region inside the image processing section 12 (S20). Then, the image data is read from the second memory region (S17).

vi) Subsequently, in the printer section P, a sheet of the size identical to the original sheet size of the second original sheet group 902 is supplied from either one of the sheet supply cassettes 151, 152 and 153 to the photoreceptor drum 121, and the read image data is transferred onto the sheet for image formation. The obtained print is discharged onto the copy tray 190 (S21 in FIG. 10). Then, it is decided whether or not the copying of sheets has been completed by the set number (S22). If the copying of sheets has not been completed by the set number, the program flow returns to step S13 to confirm that the page to be outputted this time corresponds to the page of the insertion sheet 9030 (S14 in FIG. 12) and the image data exists in the second memory region inside the image processing section 12 (S16). Thereafter, the image data is read from the second memory region (S17) to execute the image formation of the second and subsequent sets of copies in the printer section P, and the obtained print is discharged onto the copy tray 190 (S21 in FIG. 10).

vii) If the copying of sheets is thus completed by the set number, then the image data in the second memory region inside the image processing section 12 is cleared (S23), and it is decided whether or not the copied page is the last page (S24). If the copied page is not the last page, then the value of the variable n is incremented by one (+1) (S25), and the program flow returns to step S13 to execute the image formation of the next and subsequent pages. If the copied page is the last page, then the operation in this original insertion mode is completed, and the program flow returns to the initial state.

Through the above operations, the group of prints arranged in the desired order, i.e., the print group 904 corresponding to the state in which the original sheets 9021, 9022 and 9023 of the other original sheet group 902 are inserted between the desired pages of the first original sheet group 901 can be automatically obtained.

With this arrangement, the system operation enters into the mode in which the operator designates the position of insertion of the original sheets 9021, 9022 and 9023 of the second original sheet group 902 utilizing the insertion sheet 9030. Therefore, the operator is not required to input the original insertion positions one by one via the operation panel or the like, so that the input work can be performed in a short time and no erroneous input occurs. Therefore, the group of prints arranged in the desired order can be securely obtained in a short time.

II) Second operation example

Figure 13:
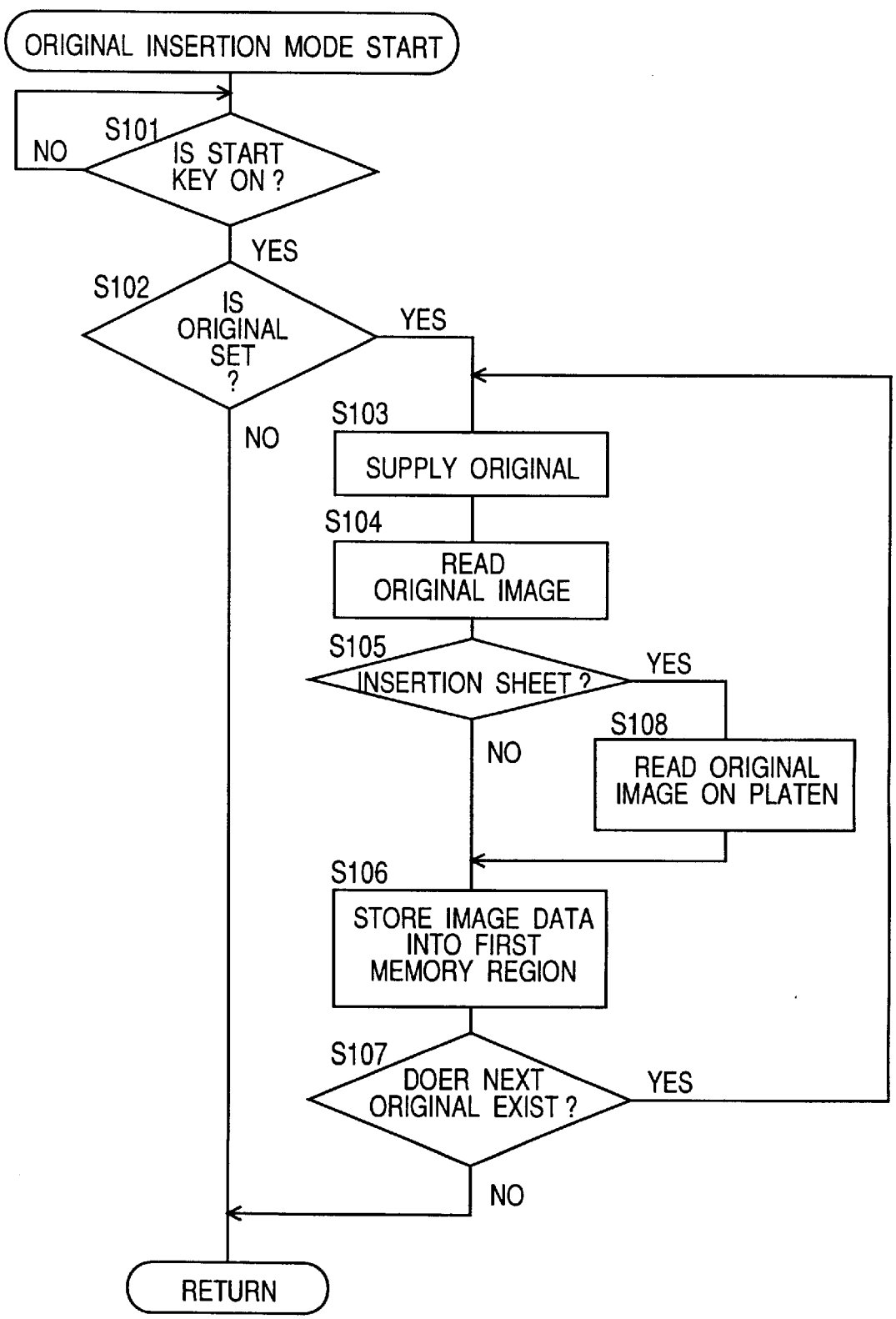
FIG. 13 is a flowchart of a second operation example in the original insertion mode of the above copying machine.

The second operation example in the original insertion mode will be described with reference to the flowchart of FIG. 13. This second operation example is an example in which the composite original sheet group 905 is set on the original tray 2101 to take the image of the original (or the insertion sheet) in movement through the slit glass 198 and an identical original sheet 9021 constituting the second original sheet group 902 is read through the platen glass 111 by moving the scanner.

It is assumed that the image processing section 12 shown in FIG. 1 is provided with a first memory region for storing therein image data.

i) The operator sets the original sheet 9021 constituting the second original sheet group 902 in an image reading position B on the platen glass 111, or the image reading position by moving the scanner.

If the start key 301 is turned on in the state in which the original insertion mode is set (S101), then it is first decided whether or not an original sheet is set on the original tray 2101 by the original loading sensor SE1 of the automatic document feeder 20 (S102). It is now assumed that the composite original sheet group 905 is set.

When the composite original sheet group 905 is set, the first original sheet (or the insertion sheet) of the composite original sheet group 905 set on the original tray 2101 is fed from the original tray 2101 through the sheet-feeding conveyance path 2118 to the image reading position A on the slit glass 198, or the image reading position for taking the original image in movement inside the reading conveyance path 2207 (S103). In this stage, the original sheet size of the composite original sheet group 905, i.e., the original sheet size of the first original sheet group 901 can be determined by the sensors SE11 and SE12 mounted on the original tray 2101 and the sensors SE6 and SE7 provided immediately on the downstream side of the sheet feed roller 2103.

Next, the image of the original fed to the image reading position A on the slit glass 198 is read by the optical system 11 of the main body 10 (S104), and it is decided whether the image data belongs to the proper original sheet 9010 or to the insertion sheet 9030 by means of the image processing section 12 (S105). In this case, the proper original sheet 9010 can be discriminated from the insertion sheet 9030 on the basis of the presence or absence of the discrimination pattern 701 shown in FIG. 8.

In the case where the sheet fed to the image reading position A on the slit glass 198 is the proper original sheet 9010, the image data is stored into the first memory region inside the image processing section 12 (S106). In the case where the sheet fed to the image reading position A on the slit glass 198 is the insertion sheet 9030, the image data of the original sheet 9021 preset in the image reading position B on the platen glass 111 is read (S108), and the image data is stored into the first memory region inside the image processing section 12 (S106). In this stage, the size of the original sheet 9021, i.e., the original sheet size of the second original sheet group 902 can be determined by the sensors 102 and 102 (see FIG. 1) provided for the optical system 11.

If the process in step S106 is completed, then it is decided whether or not there is existing the next original sheet (or the insertion sheet) on the original tray 2101 (S107).

In the case where the next original sheet exists on the original tray 2101, the program flow returns to step S103 to supply the next original sheet from the original tray 2101 through the sheet-feeding conveyance path 2118 to the image reading position A inside the reading conveyance path 2207 on the slit glass 198 (S103).

As described above, the processes from the step S103 through the step S108 are repeated until the original tray 2101 has run out of the composite original sheet group 905, thereby obtaining the image data corresponding to the state in which the identical original sheets 9021, 9021, . . . constituting the second original sheet group 902 are inserted between the desired pages of the first original sheet group 901.

ii) Subsequently, the image data of one page to be outputted this time is read from the first memory region inside the image processing section 12 on the basis of the value of the variable (output page number) n corresponding to the page of the print (copy) to be formed. Together with this operation, in the printer section P, a sheet of the size to be outputted this time is supplied from either one of the sheet supply cassettes 151, 152 and 153 to the photoreceptor drum 121, and the read image data is transferred onto the sheet for image formation. The obtained print is discharged onto the copy tray 190. Then, the image formation is executed until the copying of sheets is completed by the set number, and the obtained print is discharged onto the copy tray 190.

Through the above operations, the group of prints arranged in the desired order, i.e., the print group 904 corresponding to the state in which the original sheets 9021, 9021, . . . constituting the second original sheet group 902 are inserted between the desired pages of the first original sheet group 901 can be automatically obtained.

With this arrangement, the system operation enters into the mode in which the operator designates the position of insertion of the original sheets 9021, 9021, . . . of the second original sheet group 902 utilizing the insertion sheet 9030. Therefore, the operator is not required to input the original insertion positions one by one via the operation panel or the like, so that the input work can be performed in a short time and no erroneous input occurs. Therefore, the group of prints arranged in the desired order can be securely obtained in a short time.

(4) A modified embodiment will be described next.

Figure 14:
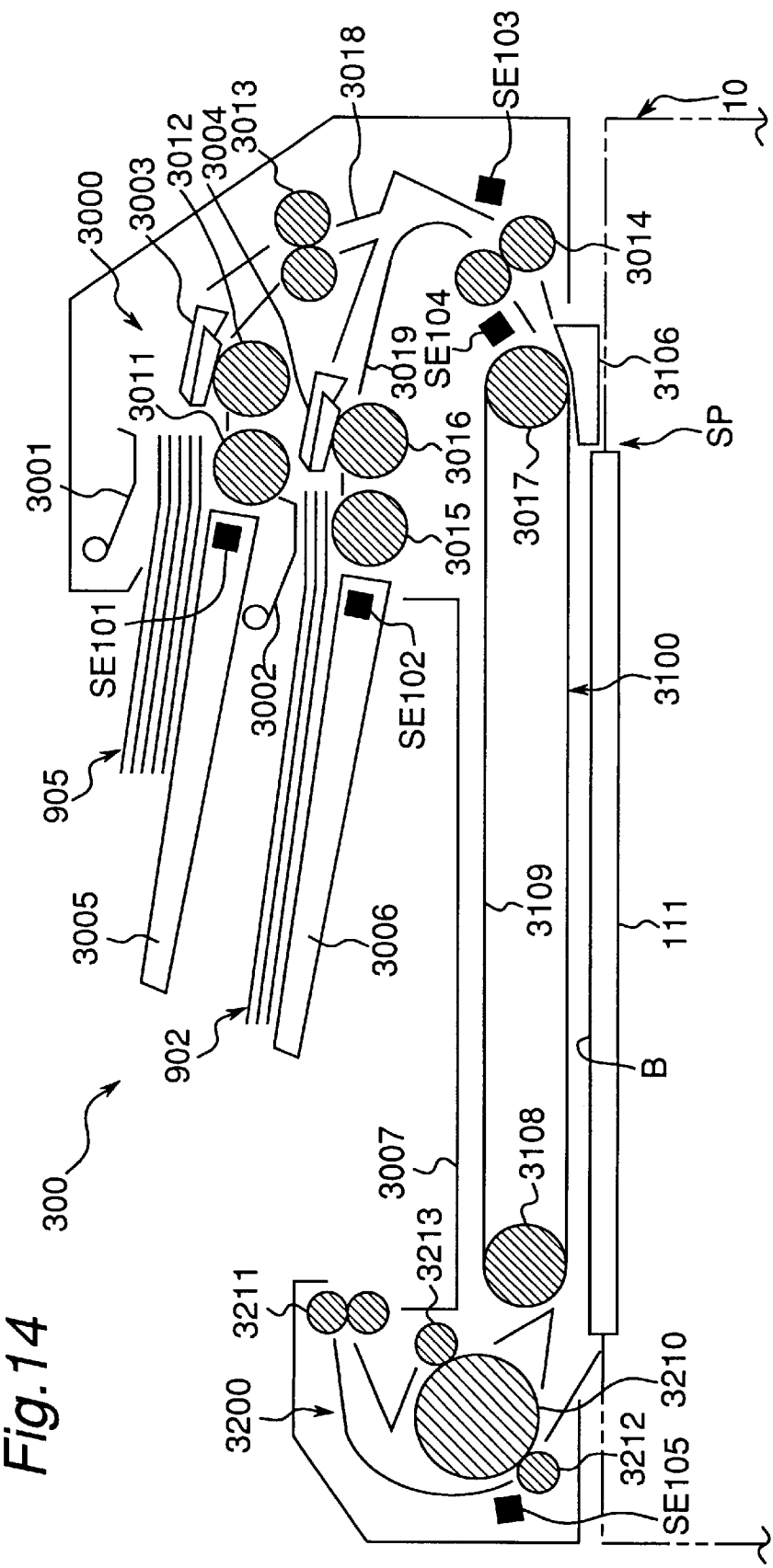
FIG. 14 is a view showing the construction of an automatic document feeder having two original trays in place of the above automatic document feeder.

The copying machine of this modified embodiment is provided with an automatic document feeder 300 having two original trays 3005 and 3006 as shown in FIG. 14 in place of the aforementioned automatic document feeder 20. It is to be noted that the copying machine main body 10 is allowed to be the one having no slit glass 198 for taking the original image in movement.

This automatic document feeder 300 is constructed roughly of: a sheet feed section 3000 having a first original tray 3005, a second original tray 3006, a first sheet feed roller 3011, a second sheet feed roller 3105, a first original sheet pressing plate 3001, a second original sheet pressing plate 3002, a first handling roller 3012, a second handling roller 3016, a first handling pad 3003, a second handling pad 3004, an intermediate roller pair 3013 and a registration roller pair 3014; a conveyance section 3100 having a conveyance guide 3106, a belt driving roller 3107, a belt driven roller 3108 and a conveyance belt 3109; an inverting/discharging section 3200 having an inverting roller 3210, a first inverting driven roller 3212, a second inverting driven roller 3213 and a discharging roller pair 3211; and a sheet discharging tray 3007.

I) Original document conveyance in an original one-side mode

In the original one-side mode, an original group is set on either one or both of the first original tray 3005 and the second original tray 3006. In each original group, the original sheets are arranged in a state in which the first original sheet is placed in the lowermost position with the surface to be copied facing up and the second and subsequent original sheets are successively stacked on the sheet.

i) If an original group is set on only the first original tray 3005 and an instruction for feeding the original sheet is transmitted from the main body 10, then the first original sheet pressing plate 3001 is lowered and the first sheet feed roller 3011 rotates to push forward the original sheets located in the lowermost position of the original group. Subsequently, the pushed original sheets are separated into individual sheets by the rotating first handling roller 3012 and first handling pad 3003.

Next, the original sheets that have been separated into individual sheets by the first handling roller 3012 and the first handling pad 3003 are each conveyed to the registration roller pair 3014 through a sheet-feeding conveyance path 3018 having an intermediate roller pair 3013. The first sheet feed roller 3011 and the first handling roller 3012 are stopped after a lapse of a specified time t for correcting the skewing of the original sheet using the nip portion of the registration roller pair 3014 after the leading end of the original sheet is detected by a registration sensor SE103.

Next, the registration roller pair 3014 and the conveyance belt 3109 are rotated to convey the original sheet to the image reading position B on the platen glass 111. In this stage, the registration roller pair 3014 and the conveyance belt 3109 are stopped after the conveyance of the original sheet over a specified distance from the time point of the detection of the passing of the trailing end of the original sheet by the registration sensor SE103. By this operation, the trailing end of the original sheet can be aligned with a reference position SP at an end portion of the platen glass 111.

In this stage, the length of the original sheet is detected on the basis of the output of the registration sensor SE103 and the amount of feed of the registration roller pair 3014, and the width of the original sheet can be detected by a width size sensor SE104. With this arrangement, the original size can be determined.

When the setting of the original sheet in the image reading position B on the platen glass 111 is completed, the copying machine main body 10 starts the image read operation by the scanner of the optical system 11 and issues an instruction for replacing the original sheet to the automatic document feeder 300 upon completion of the image reading.

The automatic document feeder 300 starts to feed the next original sheet existing in the lowermost position on the first original tray 3005 upon receiving the instruction for replacing the original sheet from the copying machine main body 10 and conveys the next original sheet to the image reading position B on the platen glass 111 through the sheet-feeding conveyance path 3018. At the same time, the original sheet that has undergone the image reading is fed into the inverting/discharging section 3200 by the conveyance belt 3109.

Next, the inverting roller 3210 and the discharging roller pair 3211 of the inverting/discharging section 3200 are rotated to discharge the original sheet onto the sheet discharging tray 3007.

The aforementioned operations are repeated until an emptiness sensor SE101 detects the fact that no original sheet is left on the first original tray 3005, and an original sheet emptiness signal 1 is transmitted from the automatic document feeder 300 to the copying machine main body at the point of time when no original sheet is left on the first original tray.

ii) In the case where the original group is set on only the second original tray 3006 and an instruction for feeding the original sheet is transmitted from the main body 10, then the second original sheet pressing plate 3002 is lowered and the second sheet feed roller 3015 rotates to push forward the original sheets located in the lowermost position of the original group. Subsequently, the pushed original sheets are each separated into individual sheets by the rotating second handling roller 3016 and second handling pad 3004.

Next, the original sheets that have been separated into individual sheets by the second handling roller 3016 and the second handling pad 3004 are each conveyed to the registration roller pair 3014 through a second sheet-feeding conveyance path 3019.

Subsequently, the original sheet is conveyed similar to the case where the original group is set on only the aforementioned first original tray 3005. The image reading is executed in the image reading position B on the platen glass 111, and thereafter the original sheet is discharged onto the sheet discharging tray 3007.

iii) In the case where original groups are set on both the first original tray 3005 and the second original tray 3006, this copying machine is able to enter into an original connection mode in which the copy operation of the original group set on the first original tray 3005 and the copy operation of the original group set on the second original tray 3006 are continuously executed.

That is, in this original connection mode, the operator sets a first copy mode of the original group set on the first original tray 3005 and a second copy mode of the original group set on the second original tray 3006 via the operation panel 30 (see FIG. 3).

If the start key 301 is turned on, then the copying machine main body 10 issues an instruction for feeding an original sheet from the first original tray 3005 to the automatic document feeder 300. By this operation, the copy operation of the original group on the first original tray 3005 is executed in the first copy mode.

At the point of time when no original sheet is left on the first original tray 3005, an original emptiness signal of the first original tray 3005 is transmitted from the automatic document feeder 300 to the copying machine main body 10. Upon receiving the original emptiness signal of the first original tray 3005, the copying machine main body 10 switches the copy mode to the second copy mode of the original group on the second original tray 3006 and instructs the automatic document feeder 300 to feed an original sheet from the second original tray 3006. By this operation, the copy operation of the original group on the second original tray 3006 is executed in the second copy mode.

As described above, the copy operation of the original group set on the first original tray 3005 and the copy operation of the original group set on the second original tray 3006 can be continuously executed.

II) Operation example in the original insertion mode

Figure 15:
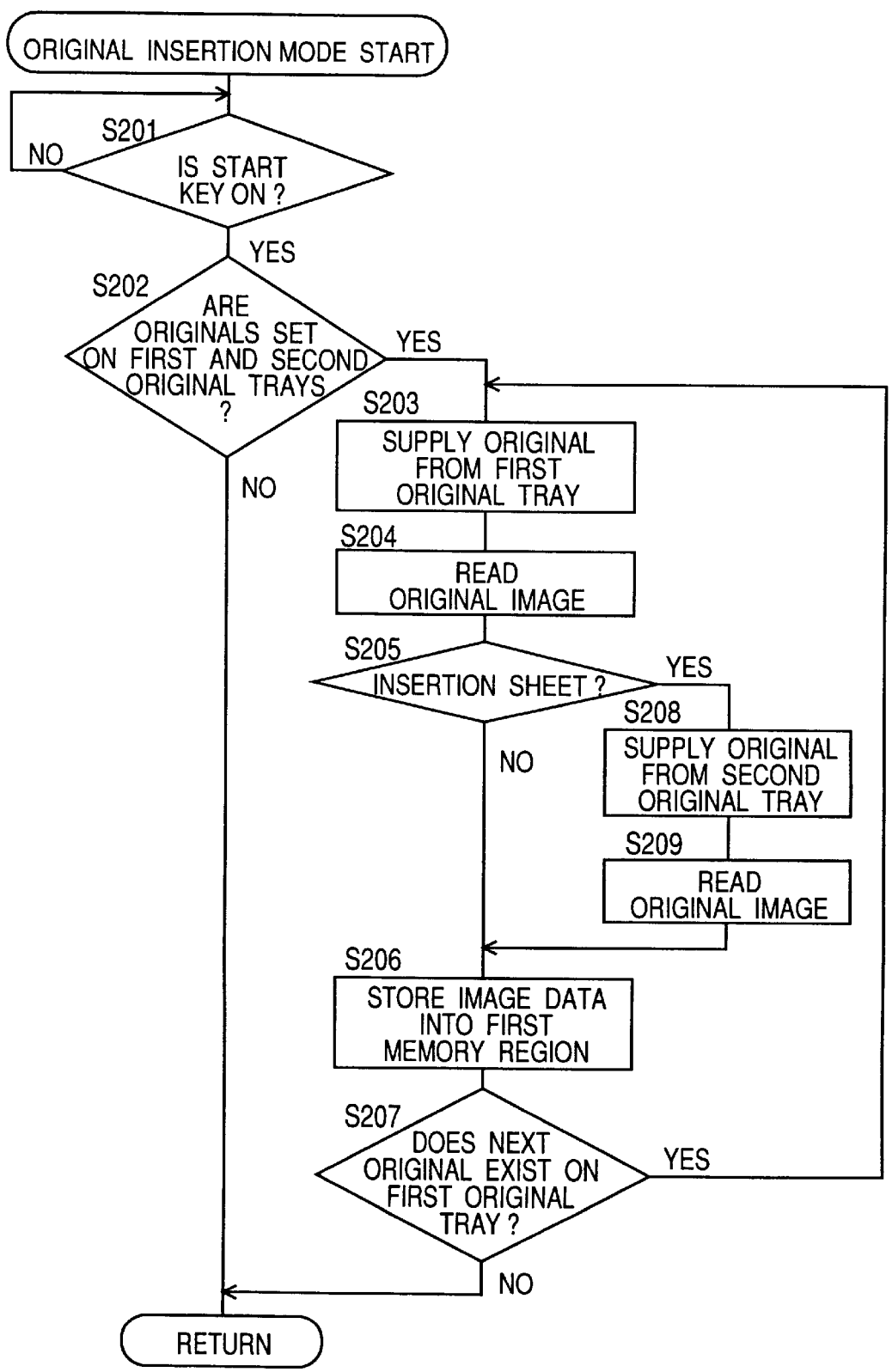
FIG. 15 is a flowchart of an operation example in the original insertion mode by means of the automatic document feeder of FIG. 14.

An operation example in the original insertion mode will be described with reference to the flowchart of FIG. 15. This operation example is an example in which the composite original sheet group 905 and the second original sheet group 902 are concurrently set on the first original tray 3005 and the second original tray 3006, respectively, and the original sheets of the original sheet groups 905 and 902 are read through the platen glass 111 by moving the scanner.

It is assumed that the image processing section 12 shown in FIG. 1 is provided with a first memory region for storing therein image data.

i) If the start key 301 is turned on in a state in which the original insertion mode is set (S201), then it is first decided whether or not an original sheet is set on the first original tray 3005 and the second original tray 3006 by the original loading sensors SE101 and SE102 of the automatic document feeder 300 (S202). It is herein assumed that the composite original sheet group 905 and the second original sheet group 902 are set on the first original tray 3005 and the second original tray 3006, respectively.

In the case where the composite original sheet group 905 and the second original sheet group 902 are set on the first original tray 3005 and the second original tray 3006, respectively, the first original sheet (or the insertion sheet) of the composite original sheet group 905 set on the first original tray 3005 is fed from the first original tray 3005 through the sheet-feeding conveyance path 3018 to the image reading position B on the platen glass 111 (S203). In this stage, the original sheet size of the composite original sheet group 905, i.e., the original sheet size of the first original sheet group 901 can be determined on the basis of the output of the registration sensor SE103 and the amount of feed of the registration roller pair 3014.

ii) Next, the image of the original sheet fed to the image reading position B on the platen glass 111 is read by the optical system 11 of the main body 10 (S204), and it is decided whether the image data belongs to the proper original sheet 9010 or to the insertion sheet 9030 by the image processing section 12 (S205). In this case, the proper original sheet 9010 can be discriminated from the insertion sheet 9030 on the basis of the presence or absence of the discrimination pattern 701 shown in FIG. 8.

In the case where the sheet fed to the image reading position B on the platen glass 111 is the proper original sheet

9010, the image data is stored into the first memory region inside the image processing section 12 (S206).

iii) In the case where the sheet fed to the image reading position B on the platen glass 111 is the insertion sheet 9030, the first original sheet (or the insertion sheet) of the second original sheet group 902 set on the second original tray 3006 is fed from the second original tray 3006 through the second sheet-feeding conveyance path 3019 to the image reading position B on the platen glass 111 (S208). In this stage, the original sheet size of the second original sheet group 902 can be determined on the basis of the output of the registration sensor SE103 and the amount of feed of the registration roller pair 3014.

Next, the image of the original fed to the image reading position B on the platen glass 111 is read by the optical system 11 of the main body 10 (S209) and the image data is stored into the first memory region inside the image processing section 12 (S206).

iv) If the process in step S206 is completed, then it is decided whether or not the next original sheet (or the insertion sheet) exists on the first original tray 3005 (S207)

If the next original sheet exists on the first original tray 3005, then the program flow returns to step S203 to feed the next original sheet from the first original tray 3005 through the first sheet-feeding conveyance path 3018 to the image reading position B on the platen glass 111 (S203).

As described above, the processes from the step S203 through the step S209 are repeated until the first original tray 3005 has run out of the composite original sheet group 905, thereby obtaining the image data corresponding to the state in which the original sheets 9021, 9022, 9023, . . . of the second original sheet group 902 are inserted between the desired pages of the first original sheet group 901.

ii) Subsequently, the image data of one page to be outputted this time is read from the first memory region inside the image processing section 12 on the basis of the value of the variable (output page number) n corresponding to the page of the print (copy) to be formed. Together with this operation, in the printer section P, a sheet of the size to be outputted this time is supplied from either one of the sheet supply cassettes 151, 152 and 153 to the photoreceptor drum 121, and the read image data is transferred onto the sheet for image formation. The obtained print is discharged onto the copy tray 190. Then, the image formation is executed until the copying of sheets is completed by the set number, and the obtained print is discharged onto the copy tray 190.

Through the above operations, the group of prints arranged in the desired order, i.e., the print group 904 corresponding to the state in which the original sheets 9021, 9022 and 9023 of the other original sheet group 902 are inserted between the desired pages of the first original sheet group 901 can be automatically obtained.

With this arrangement, the system operation enters into the mode in which the operator designates the position of insertion of the original sheets 9021, 9022 and 9023 of the second original sheet group 902 utilizing the insertion sheet 9030. Therefore, the operator is not required to input the original insertion positions one by one via the operation panel or the like, so that the input work can be performed in a short time and no erroneous input occurs. Therefore, the group of prints arranged in the desired order can be securely obtained in a short time.

It is to be noted that the operation example of this modified example can be applied not only to the digital copying machine having the first memory region in the image processing section 12 but also to an analog copying machine.

Although the insertion sheet 9030 is provided with the discrimination pattern 701 for the discrimination between the proper original sheet 9010 and the insertion sheet 9030 and the discrimination pattern 701 is detected by the image processing section 12, the present invention is not limited to this. For example, it is acceptable to bore a hole in a specified position of the insertion sheet 9030 and detect the hole by means of an optical sensor. This arrangement is able to obviate the need for the pattern recognizing process by the image processing section 12 and to reduce the processing load.

Although the original sheet size of the first original sheet group 901 and the original sheet size of the second original sheet group 902 are made different from each other, they may have an identical size. Even if the original sheet size of the first original sheet group 901 and the original sheet size of the second original sheet group 902 are identical to each other, the print group 904 corresponding to the state in which the original sheets of the second original sheet group 902 are inserted between the desired pages of the first original sheet group 901 can be obtained by executing the copy operation utterly in the same manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:
   an original conveyer which successively supplies original sheets of an original sheet group placed in a specified position to an image reading position;
   an image reader which reads an image of an original sheet fed to the image reading position;
   a discriminating section which, when a composite original sheet group obtained by making a first original sheet group comprised of original sheets of an identical size receive an insertion sheet that has the identical size and is to be inserted between arbitrary pages of the original sheet group is set in the specified position, discriminates whether the sheet fed to the image reading position by the original conveyer is the original sheet of the first original sheet group or the insertion sheet; and
   a controller which forms an image different from the image of the first original sheet group instead of the image of the insertion sheet in an image forming process of the composite original sheet group.

2. An image forming apparatus as claimed in claim 1, wherein
   the controller forms the image by reading a second original sheet group different from the first original sheet group.

3. An image forming apparatus as claimed in claim 1, further comprising:
   an image data memory which stores therein data read by the image reader.

4. An image forming apparatus as claimed in claim 3, wherein
   the image data memory stores all the data of the first original sheet group.

5. An image forming apparatus as claimed in claim 1, further comprising:
   an image data memory which stores therein data read by the image reader; and
   a position data memory which stores therein data representing a position of insertion of the insertion sheet in the composite original sheet group discriminated by the discriminating section, the image forming of the second original sheet group executing image formation by reading the original sheets of the second original sheet group, the second original sheet group being placed in the specified position, and the controller supplying the original sheets of the second original sheet group to the image reading position and executing image reading and image forming processes at the inserted position of the insertion sheet in the composite original sheet group in the image forming process.

6. An image forming apparatus as claimed in claim 1, wherein the original conveyer has an original placing position different from the specified position and the second original sheet group is placed in the original placing position.

7. An image forming apparatus as claimed in claim 1, wherein the image reader reads the original image by moving the original relative to a stationary reading optical system.

8. A control method for an image forming apparatus having an original conveyer which supplies an original sheet placed on an original tray into a specified reading position, comprising the following steps of:

an image reading step of reading an original image of a first original sheet group including a regular original and an insertion sheet;

a discriminating step of discriminating whether the read sheet of the first original sheet group is the regular original sheet or the insertion sheet; and an image forming step, in an image forming process of the first original sheet group, of forming an image different from the image of the first original sheet group instead of the insertion sheet upon discrimination of the fact that the sheet is the insertion sheet.

9. A control method as claimed in claim 8, further comprising:

a storing step of storing the image data of the first original sheet group read in the image reading step into a memory.

10. A control method as claimed in claim 9, wherein the image forming step executing image formation by reading the image data stored in the storing step in the case of image formation of the first original sheet group.

11. A control method as claimed in claim 9, further comprising:

a step of storing a position of insertion of the insertion sheet included in the first original sheet group discriminated in the discriminating step.

12. A control method as claimed in claim 8, wherein the image forming step forms an image by reading the original image of a second original sheet group.

13. A control method as claimed in claim 8, further comprising:

a step of storing a position of insertion of the insertion sheet included in the first original sheet group discriminated in the discriminating step.

* * * * *